(12) United States Patent
Rubenfield et al.

(10) Patent No.: US 11,163,588 B2
(45) Date of Patent: Nov. 2, 2021

(54) SOURCE CODE INDEPENDENT VIRTUAL REALITY CAPTURE AND REPLAY SYSTEMS AND METHODS

(71) Applicant: VREAL Inc, Seattle, WA (US)

(72) Inventors: Dan Rubenfield, Seattle, WA (US); Brett Holton, Seattle, WA (US); David Franzi, Seattle, WA (US)

(73) Assignee: VREAL INC., Seattle, WA (US)

( * ) Notice: Subject to any disclaimer, the term of this patent is extended or adjusted under 35 U.S.C. 154(b) by 0 days.

(21) Appl. No.: 16/289,557

(22) Filed: Feb. 28, 2019

(65) Prior Publication Data

US 2019/0272184 A1 Sep. 5, 2019

Related U.S. Application Data

(60) Provisional application No. 62/802,007, filed on Feb. 6, 2019, provisional application No. 62/801,997, filed
(Continued)

(51) Int. Cl.
| | |
|---|---|
| *G06F 9/445* | (2018.01) |
| *G06F 9/54* | (2006.01) |
| *G06F 9/455* | (2018.01) |
| *G06F 3/14* | (2006.01) |
| *G06F 8/34* | (2018.01) |
| *G06F 8/70* | (2018.01) |

(Continued)

(52) U.S. Cl.
CPC ........ *G06F 9/44521* (2013.01); *A63F 13/497* (2014.09); *A63F 13/525* (2014.09); *A63F 13/86* (2014.09); *G06F 3/14* (2013.01); *G06F 8/34* (2013.01); *G06F 8/70* (2013.01); *G06F 9/45504* (2013.01); *G06F 9/54* (2013.01); *G06F 9/541* (2013.01); *G06T 19/006* (2013.01); *A63F 2300/8082* (2013.01)

(58) Field of Classification Search
None
See application file for complete search history.

(56) References Cited

U.S. PATENT DOCUMENTS

| | | |
|---|---|---|
| 9,473,758 B1 | 10/2016 | Long et al. |
| 9,573,062 B1 | 2/2017 | Long et al. |
| | (Continued) | |

OTHER PUBLICATIONS

Final Office Action dated Jun. 21, 2019 for U.S. Appl. No. 15/057,003.
(Continued)

*Primary Examiner* — Charles E Anya
(74) *Attorney, Agent, or Firm* — Wilson Sonsini Goodrich & Rosati

(57) ABSTRACT

Systems and methods for modifying for extracting assets from a target program. The systems and methods may include or be configured to locate function calls and properties of classes within a DLL associated with the target program, modify the DLL by inserting a redirector function in the DLL to redirect the function to a communication assembly module, insert the communication assembly module into a location accessible to the DLL, parse the DLL associated with the target program for opcodes used by the redacted functions, and modify the communication assembly modules to receive the opcode and associated parameters and to pass the opcode and associated parameters to a target source engine assembly.

3 Claims, 19 Drawing Sheets

Related U.S. Application Data on Feb. 6, 2019, provisional application No. 62/637,280, filed on Mar. 1, 2018.

(51) Int. Cl.

| | | |
|---|---|---|
| *G06T 19/00* | (2011.01) | |
| *A63F 13/497* | (2014.01) | |
| *A63F 13/525* | (2014.01) | |
| *A63F 13/86* | (2014.01) | |

(56) References Cited

U.S. PATENT DOCUMENTS

| | | |
|---|---|---|
| 9,616,338 B1 | 4/2017 | Hooper et al. |
| 2002/0154214 A1 | 10/2002 | Scallie et al. |
| 2006/0058103 A1 | 3/2006 | Danieli et al. |
| 2007/0060343 A1 | 3/2007 | Sakaguchi et al. |
| 2007/0117617 A1 | 5/2007 | Spanton et al. |
| 2007/0117635 A1 | 5/2007 | Spanton et al. |
| 2008/0268961 A1 | 10/2008 | Brook et al. |
| 2009/0118017 A1 | 5/2009 | Perlman et al. |
| 2009/0125967 A1 | 5/2009 | Perlman et al. |
| 2009/0199089 A1 | 8/2009 | Bulusu et al. |
| 2011/0126255 A1 | 5/2011 | Perlman et al. |
| 2011/0294576 A1 | 12/2011 | Blanco et al. |
| 2012/0093214 A1 | 4/2012 | Urbach |
| 2013/0335509 A1 | 12/2013 | Cafferata |
| 2014/0168229 A1 | 6/2014 | Ungureanu et al. |
| 2014/0194211 A1 | 7/2014 | Chimes et al. |
| 2014/0380102 A1* | 12/2014 | Lindo ............... G06F 11/3624 714/38.11 |
| 2016/0158656 A1* | 6/2016 | Condrey ............... A63F 13/63 463/31 |
| 2016/0361658 A1 | 12/2016 | Osman et al. |
| 2017/0006074 A1* | 1/2017 | Oates, III ............ H04N 21/472 |
| 2017/0072323 A1 | 3/2017 | Malenfant |
| 2017/0157512 A1 | 6/2017 | Long et al. |
| 2017/0161174 A1* | 6/2017 | Daudel ............... G06F 9/44521 |
| 2017/0249785 A1 | 8/2017 | Hooper et al. |
| 2018/0033115 A1* | 2/2018 | Rasmussen ......... G06F 11/3636 |
| 2018/0139257 A1* | 5/2018 | Ninoles ............... H04L 65/4092 |
| 2019/0270011 A1 | 9/2019 | Rubenfield et al. |
| 2019/0272156 A1 | 9/2019 | Rubenfield et al. |

OTHER PUBLICATIONS

Notice of Allowance dated Nov. 30, 2016 for U.S. Appl. No. 15/239,740.
Office Action dated Mar. 10, 2017 for U.S. Appl. No. 15/057,003.
Office Action dated Jun. 21, 2017 for U.S. Appl. No. 15/057,003.
Office Action dated Jul. 6, 2020 for U.S. Appl. No. 16/289,454.
Office Action dated Jul. 14, 2020 for U.S. Appl. No. 16/289,548.
Office Action dated Oct. 6, 2016 for U.S. Appl. No. 15/239,740.
Office action dated Dec. 17, 2018 for U.S. Appl. No. 15/057,003.
Seddon, C.: OpenGL Game Development. Wordware Publishing, Inc. 497 total pages (2005).
U.S. Appl. No. 16/289,548 Final Office Action dated Mar. 10, 2021.

* cited by examiner

```
                                                                                            ← 2140
2142 ┌ [VRLRedirector(TypeName = "UnityEngine.Transform", MethodName = "set_position", IsStatic = false,
     │  VRLMessageTypeName = Transform_position")] public static void VRLTransformRedirector_position(UnityEngine.
     └  Transform vrlTarget,UnityEngine.Vector3 value) ← 2144
     {
       vrlTarget.position =value;
       if(!VRLUtils.ShouldRecord ((UnityEngine.Transform)vrlTarget))  ┐
       {                                                              │
           return;                                                    ├ 2146
       }                                                              │
2148 ┌ int vrlTargetID = VRLResourceMapping.Instance.GetId(vrlTarget);│
     │ if(!VRLResourceMapping.ValidID(vrlTargetID))                   ┘
     └ {
         if(VRLConfig.Instance.logMissingResources)
         {
             VRLLogger_VRLTransformRedirector.LogError("No valid ID found for UnityEngine.
             Transform {0}", vrlTarget.ToString());
2150 ┐   }
     │   return;
     └ }
2152 ── VRLWorker.Instance.AddJob(VRLQueueEnum.RECORDING_QUEUE, VRLGeneratedMessageTypes.
       Transform_position, vrlTargetID, value);
     }
```

FIG. 15B

SOURCE CODE INDEPENDENT VIRTUAL REALITY CAPTURE AND REPLAY SYSTEMS AND METHODS

CROSS-REFERENCE

This application claims the benefit of U.S. Provisional Application No. 62/802,007, filed Feb. 6, 2019, U.S. Provisional Application No. 62/801,997, filed Feb. 6, 2019, and U.S. Provisional Application No. 62/637,280, filed Mar. 1, 2018, which applications are incorporated herein by reference in their entirety.

FIELD

The present disclosure relates to computing techniques for capturing, generating, and replaying gameplay, virtual reality, and 3-D generated sessions and more particularly, to systems and methods for capturing, generating, and replaying such sessions on disparate platforms, to systems and methods for generating and replaying sessions to reduce and distribute computing workload on gameplay and replay systems, and systems and methods for generating and replaying sessions independent of the source code used to create and play the session.

BACKGROUND

Gameplay, virtual reality, and 3-D generated sessions describe a simulated environment designed to provide a user with an interactive sensory experience, such as the replication of the sensory experience of the user's physical presence in an artificial environment in a reality-based environment or a non-reality-based environment, such as a video game or 3-D environment. In addition to the visual components, gameplay, virtual reality, and 3-D generated sessions may include audio and haptic components.

Some conventional software applications, particularly video games where multiple players interact with a video game program within the same video game session, allow non-participating, "spectator," users to passively interact with the game session, e.g. by selectively navigating around the game session's environment, while the game session is ongoing.

Some conventional applications that generate gameplay, virtual reality, and 3-D generated sessions, such as the game engines of a video game, may include a static replay creation feature that records game-state data and gameplay inputs corresponding to a game session and allows a user to view a replay video of the game session within the video game. Such a replay uses the game-state data and game inputs to replay the session using the original or native game engine and graphics engine.

Third party tools can capture the display data generated during a game session and store it in a video format for later playback are also known. Video-based replays created by the third-party tools support sharing via online playback and commonly available video players but require much more storage space than replays created with in the context of the video game itself. Moreover, such video-based replays merely record the 2-D projection from a single (or single stereo-optic) point of view of the visuals shown during the session and cannot record the 3-D, haptic, and other aspects of the session.

These exiting tools illustrate a recognition that video game users may desire to record a game session in order to replay at a later time or to distribute for others replay, e.g. for entertainment purposes, similar to viewing a recorded sporting event. Game replays may also be used in the prevention and detection of cheating or to develop skill at a video game, e.g. by watching better players and observing their techniques. Video game replays may also be used to raise stature in a particular game's user community, e.g. to establish rankings among players or to settle disputes. Video game replays are also used to produce replay reviews, i.e. a review of a game replay by an experienced player to determine what can be done to improve and expand upon the original player's skill or as a video game talk show.

None of these existing replay technologies allow for VR and 3-D replay on disparate platforms. Accordingly, players own and use each platform on which they want to replay sessions, such as game sessions and developers develop replay for each particular platform and application.

Moreover, when viewing a replay or current game session from one or more spectator points of view, the game is re-rendered on the local machine. This rendering overhead means that the same computing resources are used for running and rendering the game play for the player and also the rendering the game play for the spectators at one or more additional points of view.

Because of this, if a spectator wished to place a camera to record the game play and then render a 2D video feed, the game play computer takes on the additional rendering overhead of that camera. Now the game play computer is rendering the game from multiple perspectives. This additional computing overhead negatively impacts the VR and non-VR game play performance because there is more competition (between the game play and spectator views) for rendering and compute resources.

Some conventional software applications, particularly video games where multiple players interact with a video game program within the same video game session, allow for recording and playback of gameplay sessions, however integrating a recording and replay framework to a game or virtual reality product is an involved and intrusive process that may include an entire re-architecting of the product in order to consider and account for which portions and elements of the program are replay pertinent. Such re-architecting directly impacts the development cycle and total work involved in creating a product, such as a video game or other application.

SUMMARY

The systems and methods described above suffer the resource allocation problems. A solution described herein, below, is to use a shadow client. A shadow client is a replay client running on a different machine, either local or in the cloud. A shadow client consumes the same data stream as a spectator client, but operates under the control of the spectator client to render various points of view within the session.

Described herein are systems and methods that provide an automatic and post-ship mechanism for adding recording and playback support to a published product, for example, without modifications to or re-architecting of the published product's source code.

Described herein are methods and systems for systems and methods for capturing, generating, and replaying virtual reality sessions. A method for replaying a visual program session is disclosed. The method may include capturing messages of a program session of a first program. The messages may be in a first format for a first rendering engine. The method may also include identifying program assets within in the program stream. In some embodiments, the method includes generating a manifest of common assets based on the program assets and their respective timing in the stream and may also include generating a common message stream in a second format, the common message stream being based on the program stream, the common message stream comprising common messages corresponding to the program messages. The method may include retrieving the common assets from data store and also redisplaying the program session by generating visual elements of the program session using a second rendering engine.

In some embodiments, the messages of the program session are messages sent from the first program or the first rendering engine. In some embodiments, the first program is a game program, a virtual reality program, or a 3-D game program, or a combination of thereof.

The redisplaying the program session by generating visual elements of the program session using the second rendering engine may be accomplished without the use of the first program. In some embodiments, a first device captures the messages of the program session and a second device redisplays the program session.

The first device may include the first program and the first rendering engine and the second device may not include the first program and does not include the first rendering engine.

In some embodiments, the method includes determining the asset type of program asset and transforming the program asset to the common asset.

A system for capturing and replaying a visual program session is also disclosed. The system may include a program module configured to receive program input from a user during the visual program session and generate a stream of program messages in a first format. The system may also include a first graphics module configured to receive the stream of program messages and generate program visuals and output the program visuals to a display. In some embodiments, the system may include a session capture module configured to capture the program messages and output the program messages and may include a replay module configured to receive the program messages from the session capture module, convert the program messages to a common message stream in a second format, and output the common message stream. The system may also include a second graphics module configured to receive and replay the common message stream to regenerate the visuals of the visual program session.

In some embodiments, the messages of the program session are messages sent from the first program. In some embodiments, the session capture module is configured to output the program messages to the first graphics module and the replay module. In some embodiments, the program module comprises one or more of a game program, a virtual reality program, and a 3-D game program.

In some embodiments, the system includes a capture device comprising the program module and first graphics module. The system may also include a replay device comprising the second graphics module, wherein the capture device and replay device are coupled in electronic communication with each other.

In some embodiments, the capture device and replay device are coupled in electronic communication with each other through a server device. In some embodiments, the server device comprises the session capture module and the replay module. In some embodiments, the stream of program messages are a stream of graphics engine function calls.

Systems and methods for modifying for extracting assets from a target program are disclosed. The systems and methods may include or be configured to locate function calls and properties of classes within a DLL associated with the target program, modify the DLL by inserting a redirector function in the DLL to redirect the function to a communication assembly module, insert the communication assembly module into a location accessible to the DLL, parse the DLL associated with the target program for opcodes used by the redacted functions, and modify the communication assembly modules to receive the opcode and associated parameters and to pass the opcode and associated parameters to a target source engine assembly.

Some embodiments may include, monitoring operation of the target program during execution and identifying DLLs based on the monitoring of the operation of the target program during execution. The systems and methods may identify classes based on the monitoring of the operation of the target program during execution.

Some embodiments may include building a memory map based on the monitoring of the operation of the target program during execution and identifying classes based on the memory map. Some embodiments may include generating a redirector function for each function, the redirector configured to receive a function name and input and output parameters of each function and pass the function name and input and output parameters to the communication assembly. The classes may be one or more of graphics rendering classes, audio playback classes or haptic feedback classes.

Systems and methods for modifying for recording function calls are disclosed. The systems and methods may include or be configured to start a target program for execution, call functions by the executing program for execution by a target engine, intercept the function calls, pass the intercepted function calls to both a target engine and a communication assembly, execute the intercepted function calls by the target engine, filter the function call data of the intercepted function calls, and store the filtered function call data as a replay stream.

In some embodiments filtering includes comparing a second of the intercepted function calls with a first of the function calls, determining that the first function call and the second function call includes duplicate function all data, and storing comprises storing function call data of the first function call and not the second function call.

The systems and methods may include serializing the filtered function call data before storing the filtered function call data. Serializing the filtered function call data may include converting the filtered function data from a collection of primitives to a serialized format.

Some embodiments may include transmitting the serialized data to a second device that is remote from a first device that executes the target program. The function calls may be intercepted before execution by the target engine. Some embodiments may include assigning a unique object ID to an object called by an intercepted function.

Systems and methods for modifying for replaying a replay stream of game session on a target program are disclosed. The systems and methods may include or be configured to instantiate a target program for replay of the replay stream, intercepted initialization calls made by the target program, pass a first subset of initialization calls to the core engine, initialize the core engine, receive a first replay stream, prepare content used in the first replay stream, and execute the first replay stream using the core engine. In some embodiments the first subset of initialization calls are core engine function calls. The initialization calls may include a second subset of calls, the second subset of calls being gameplay calls. The gameplay calls may not passed to the core engine.

In some embodiments executing the replay stream may include generating function calls based on function call data within the first replay stream to the target program graphics engine and further comprises generating a graphical representation of the session from a first point of view.

In some embodiments the system or method may generate a second replay stream based on the replay of the first replay stream, the second replay stream being based on second point of view within the generated graphical representation.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 15B illustrates a redirector according to one or more embodiments disclosed herein.

DETAILED DESCRIPTION

A better understanding of the features and advantages of the present disclosure will be obtained by reference to the following detailed description that sets forth illustrative embodiments, in which the principles of embodiments of the present disclosure are utilized, and the accompanying drawings.

Although the detailed description contains many specifics, these should not be construed as limiting the scope of the disclosure but merely as illustrating different examples and aspects of the present disclosure. It should be appreciated that the scope of the disclosure includes other embodiments not discussed in detail above. Various other modifications, changes and variations which will be apparent to those skilled in the art may be made in the arrangement, operation and details of the methods, systems, and apparatus of the present disclosure provided herein without departing from the spirit and scope of the invention as described herein. Although the disclosure below is described with reference to gameplay and gameplay sessions, it is understood that the embodiments described herein apply to other sessions, such as virtual reality, and 3-D and 2-D sessions.

Virtual Reality Capture And Replay

Figure 1:
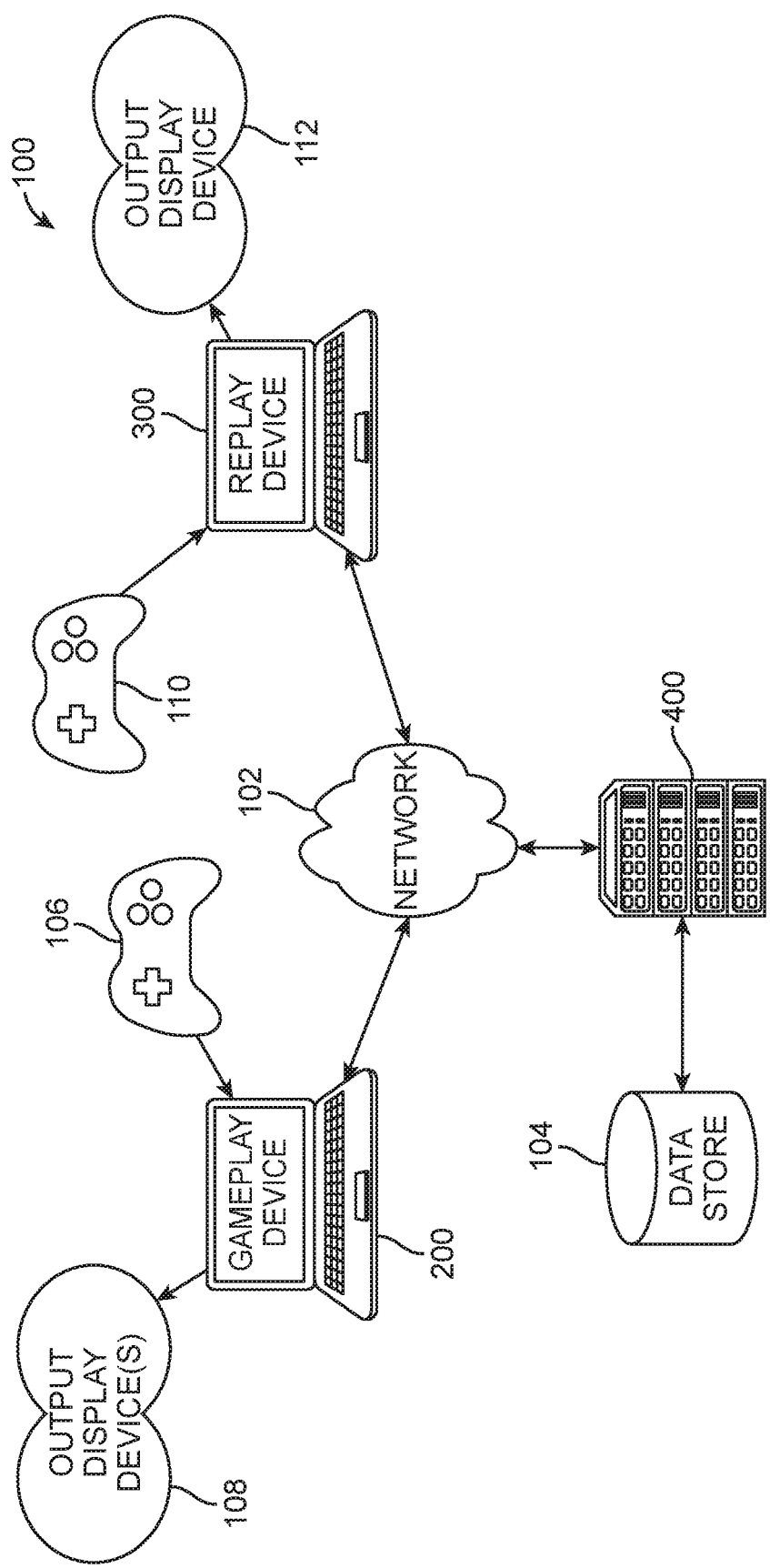
FIG. 1 illustrates exemplary topology of a gameplay session capture/replay system according to one or more embodiments disclosed herein.

FIG. 1 illustrates an exemplary topology of a virtual reality session capture/replay system 100 in accordance with various embodiments. The system 100 includes a client capture device 200, a client replay device 300, and a server 400 in data communication with a network 102. In various embodiments, network 102 may include the Internet, one or more local area networks ("LANs"), one or more wide area networks ("WANs"), cellular data networks, and/or other data networks. Network 102 may, at various points, be a wired and/or wireless network. Server 400 may be in data communication with a data store 104. Although depicted as three separate devices, in some embodiments, the client capture device 200, the client replay device 300, and the server 400, or aspects thereof may be implemented in more or less than three devices. For example, in some embodiments, the client capture device 200, the client replay device 300, and the server 400 may be implemented on a single device. In such embodiments, the various aspects and features of the device may be connected in electronic communication using local communications, such as, for example, a communication bus.

In various embodiments, a client capture device 200, a client replay device 300, and server 400 may be networked client virtual reality devices. In the example shown in FIG.

1, client capture device 200, client replay device 300, and server 400 are depicted as having a laptop/notebook or server computer form factor. Depending on the embodiment, the hardware embodying client capture device 200, client replay device 300, and/or server 400 may have a form factor comparable to a general purpose computer (including "desktop," "laptop," "notebook," "tablet" computers, or the like); a mobile phone; "smart glasses," or other wearable client virtual reality device; a video game console; a specialized hardware device specifically designed for the implementation of the present systems and methods; or the like. In various embodiments there may be many more instantiations of client capture device 200, client replay device 300, and server 400 than are shown in FIG. 1. The functional components of an exemplary, form-factor independent, client capture device 200 are described below in reference to FIG. 2. The functional components of an exemplary, form-factor independent, client replay device 300 are described below in reference to FIG. 3. The functional components of an exemplary, form-factor independent, server 400 are described below in reference to FIG. 4. An exemplary virtual reality input device(s) 106 and an exemplary VR output display device(s) 108 are connected to client capture device 200 for obtaining user input and providing visual output, respectively. An exemplary perspective selection input device 110 and an exemplary VR output display device 112 are connected to client replay device 300. In many embodiments, there may be additional input devices, such as a positional tracker, and output devices, such as headphones, and haptic feedback devices connected to client capture device 200 and/or client replay device 300.

In various embodiments, server 400 may be a networked client virtual reality device generally capable of accepting requests over network 102, e.g. from client capture device 200, client replay device 300, and/or other networked computing devices, and providing responses accordingly. The functional components of an exemplary server 400 are described below in reference to FIG. 4.

Figure 2:
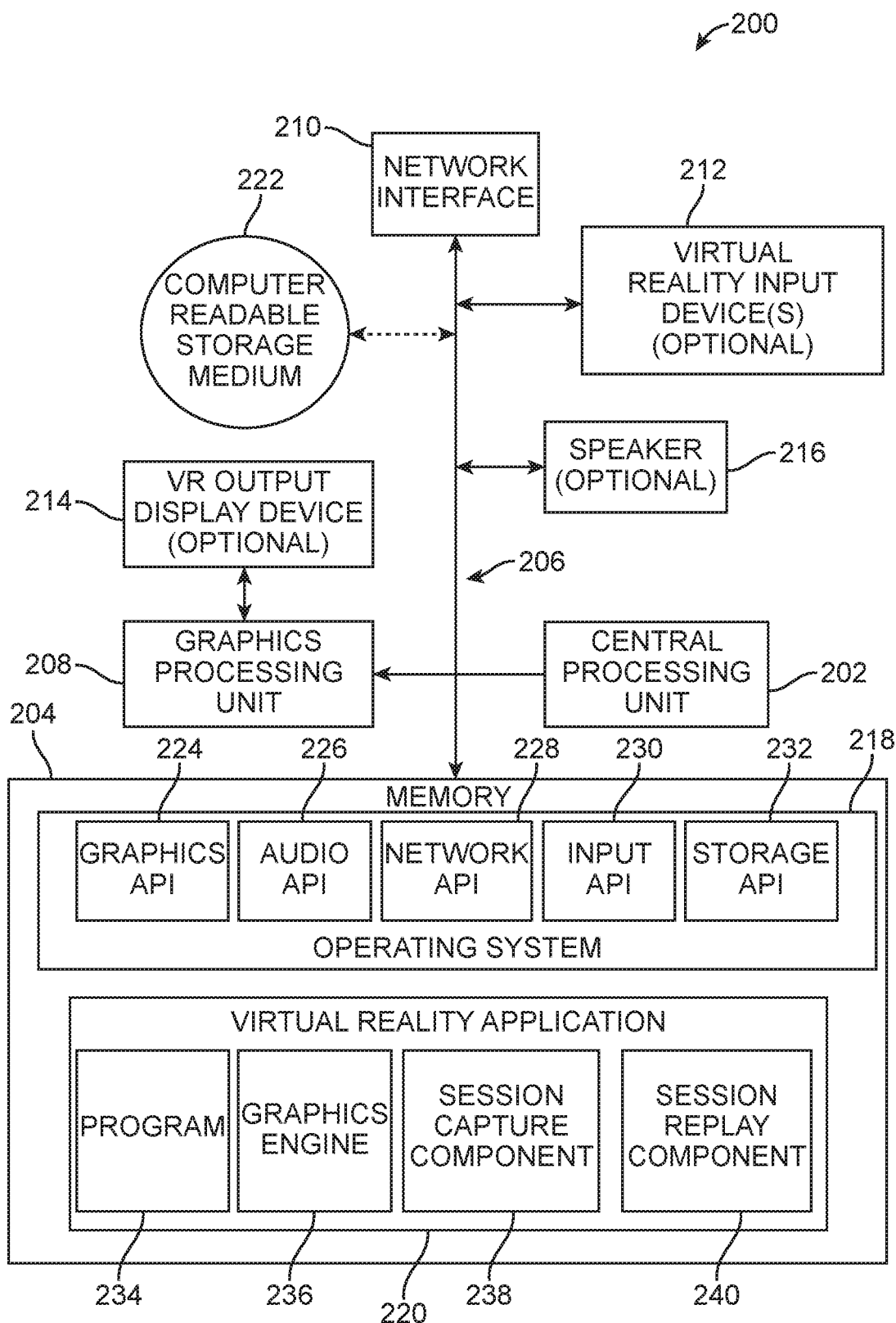
FIG. 2 illustrates several components of an exemplary client gameplay device in accordance with at least one embodiment.

Referring to FIG. 2, several components of an exemplary client capture device 200 are illustrated. In some embodiments, a client gaming device may include many more components than those shown in FIG. 2. However, it is not necessary that all of these generally conventional components be shown in order to disclose an illustrative embodiment. As shown in FIG. 2, exemplary client capture device 200 includes a central processing unit 202 in data communication with memory 204 via an item 206.

Central processing unit 202 is an electronic circuit designed to carry out instructions of a computer program, e.g. obtained from memory 204, by performing the basic arithmetic, logical, control and input/output (I/O) operations specified by the program's instructions. Central processing unit 202 may have multiple processor cores. A multi-core processor is a single computing component with two or more independent data processing units (called "cores"), which are the units that read and execute program instructions. Multiple cores can process multiple instructions at the same time, increasing overall speed for applications amenable to parallel computing, such as virtual reality applications.

Memory 204 generally comprises some or all of random access memory (RAM), read-only memory (ROM), and/or a permanent mass storage device, such as a disk drive, flash memory, or the like.

Client capture device 200 may also include a network interface 210 for connecting to a network such as network 102, a virtual reality input device(s) (optional) 212 (or a user input port for connecting an external user input device, such as virtual reality input device(s) 106), a speaker (optional) 216 (or an output port for connecting to an external audio device), and the like.

In certain embodiments, client capture device 200 may include graphics processing unit 208. Graphics processing unit 208 is an electronic circuit designed to rapidly manipulate and alter electronic data to accelerate the creation of images in a frame buffer intended for output to a display. Graphics processing unit 208 may be in data communication with a VR output display device (optional) 214 (or an output port for connecting to an external virtual reality display device such as VR output display device(s) 108). In some embodiments, speaker (optional) 216 and VR output display device (optional) 214 may be integrated into a single hardware device.

Memory 204 of exemplary client capture device 200 may store program code, executable by central processing unit 202, corresponding to an operating system 218, as well as program code corresponding to a virtual reality application 220 and other software applications.

Virtual reality application 220, and other software applications, as well as various data files may be loaded into memory 204 via network interface 210 or via a computer readable storage medium 222, such as a hard-disk drive, a solid-state drive, an optical disc, a removable memory card, and/or the like.

In operation, operating system 218 manages the hardware and software resources of the client capture device 200 and provides common services and memory allocation for various software applications, such as virtual reality application 220. To enable software applications, such as virtual reality application 220 to interact with various hardware components of client capture device 200, such as network communications via network interface 210, obtaining input data via virtual reality input device(s) (optional) 212, rendering output data via VR output display device (optional) 214 and/or speaker (optional) 216, operating system 218 may provide a variety application program interfaces (APIs), such graphics API 224, such as the OpenGL (managed by Khronos Group of Beaverton, Oreg.), Direct3D (developed by Microsoft Corporation of Redmond, Wash.), proprietary APIs, and the like; an audio API 226; a network API 228; an input API 230, a storage API 232; and the like.

Virtual reality application 220 may include a program 234, such as a VR video game or a 2-D or 3-D video game, a graphics engine 236, such as the Unity Engine (developed by Unity Technologies of San Francisco, Calif.), a session capture component 238, and (optionally) a session replay component 240. Instructions of program 234 may be executed by central processing unit 202 and may call various functions of graphics engine 236 in order to render visual data generated by the program. The functions of graphics engine 236 may be executed by central processing unit 202 and/or graphics processing unit 208.

Although an exemplary client capture device 200 has been described, a client gaming device may be any of a great number of computing devices capable of executing program code, such as the program code corresponding to operating system 218 and virtual reality application 220 and rendering the visual data generated by virtual reality application 220.

Figure 3:
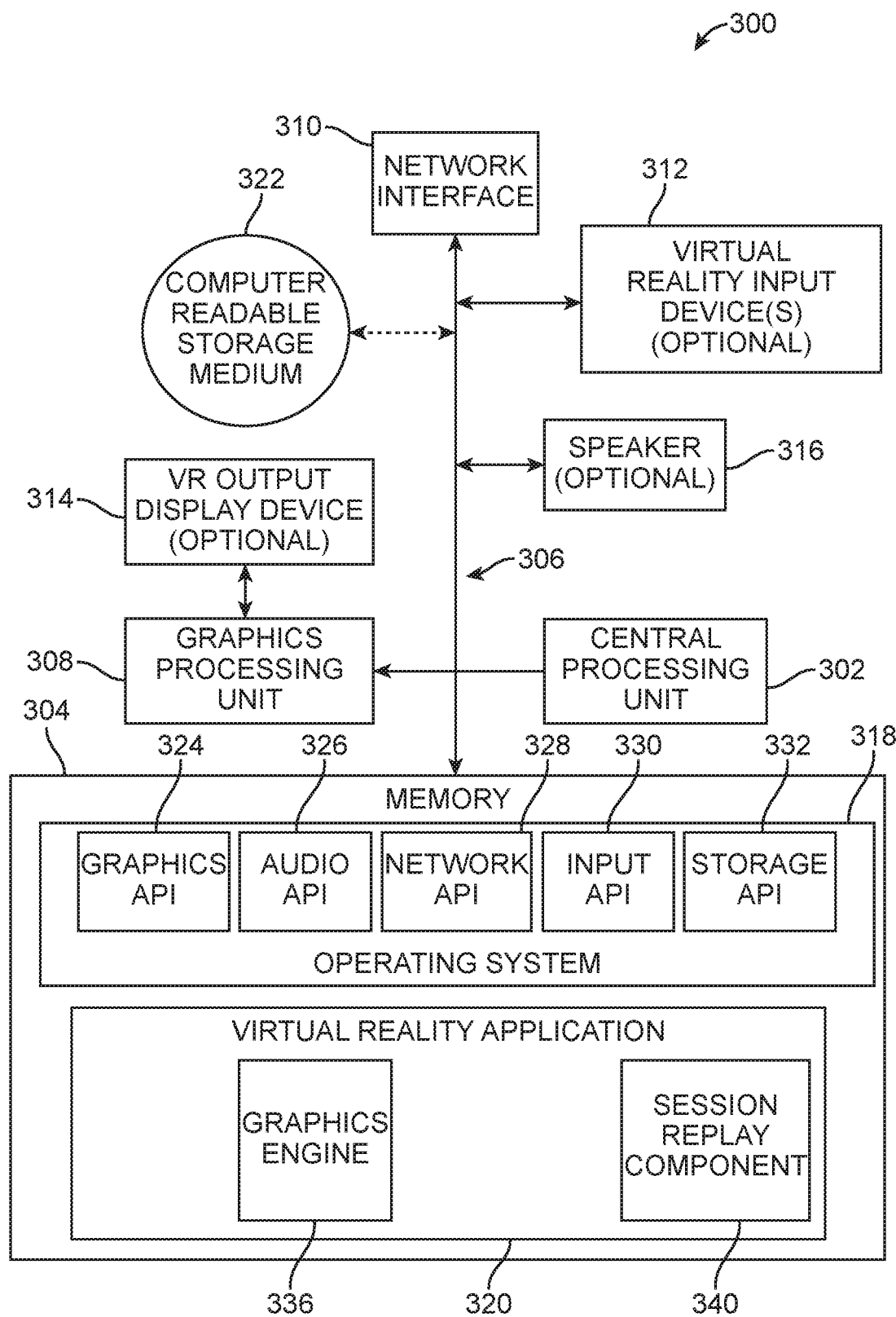
FIG. 3 illustrates several components of an exemplary client replay device according to one or more embodiments disclosed herein.

Referring to FIG. 3, several components of an exemplary client replay device 300 are illustrated. Client replay device 300 may include many or all of the same hardware and software components as client capture device 200. In some embodiments, a client replay device may include many more components than those shown in FIG. 3. However, it is not necessary that all of these generally conventional components be shown in order to disclose an illustrative embodiment.

As shown in FIG. 3, exemplary client replay device 300 includes a central processing unit 302 in data communication with memory 304 via an item 306. Central processing unit 302 is an electronic circuit designed to carry out instructions of a computer program, e.g. obtained from memory 304, by performing the basic arithmetic, logical, control and input/output (I/O) operations specified by the program's instructions. Memory 304 generally comprises some or all of random access memory (RAM), read-only memory (ROM), and/or a permanent mass storage device, such as a disk drive, solid-state device, flash memory, and/or the like.

Client replay device 300 may also include a network interface 310 for connecting to a network such as network 102, a virtual reality input device(s) (optional) 312, or a user input port for connecting an external user input device, such as perspective selection input device 110, a speaker (optional) 316, or an output port for connecting to an external audio device), and the like.

In certain embodiments, client replay device 300 may include graphics processing unit 308. Graphics processing unit 308 is an electronic circuit designed to rapidly manipulate and alter electronic data to accelerate the creation of images in a frame buffer intended for output to a display. Graphics processing unit 308 may be in data communication with a VR output display device (optional) 314, or an output port for connecting to an external virtual reality display device such as VR output display device 112. In some embodiments, speaker (optional) 316 and VR output display device (optional) 314 may be integrated into a single hardware device.

Memory 304 of exemplary client replay device 300 may store program code, executable by central processing unit 302, corresponding to an operating system 318, as well as program code corresponding to a virtual reality application 320 and other software applications.

Virtual reality application 320 and other software applications, as well as various data files may be loaded into memory 304 via network interface 310 or via a computer readable storage medium 322, such as a hard-disk drive, a solid-state drive, an optical disc, a removable memory card, and/or the like.

In operation, operating system 318 manages the hardware and software resources of the client replay device 300 and provides common services and memory allocation for various software applications, such as virtual reality application 320. To enable software applications, such as virtual reality application 320 to interact with various hardware components of client replay device 300, such as network communications via network interface 310, obtaining input data via virtual reality input device(s) (optional) 312, rendering output data via VR output display device (optional) 314 and/or speaker (optional) 316, operating system 318 may provide a variety application program interfaces (APIs), such a graphics API 324, such as the OpenGL (managed by Khronos Group of Beaverton, Oreg.), Direct3D (developed by Microsoft Corporation of Redmond, Wash.), proprietary graphics APIs, and the like; an audio API 326; a network API 328; an input API 330, a storage API 332, and the like.

Virtual reality application 320 includes a graphics engine 336, such as the Unity Engine (developed by Unity Technologies of San Francisco, Calif.) and a session replay component 340. In some embodiments, the application 320 may also include a session capture component, and a session replay component, similar such components described above with respect to the capture device 200. Instructions of virtual reality application 320 may be executed by central processing unit 302 and graphics processing unit 308 in order to render visual data generated by a session replay data stream.

Although an exemplary client replay device 300 has been described, a client replay device may be any of a great number of computing devices capable of executing program code, such as the program code corresponding to operating system 318 and rendering the visual data generated by virtual reality application 320.

Figure 4:
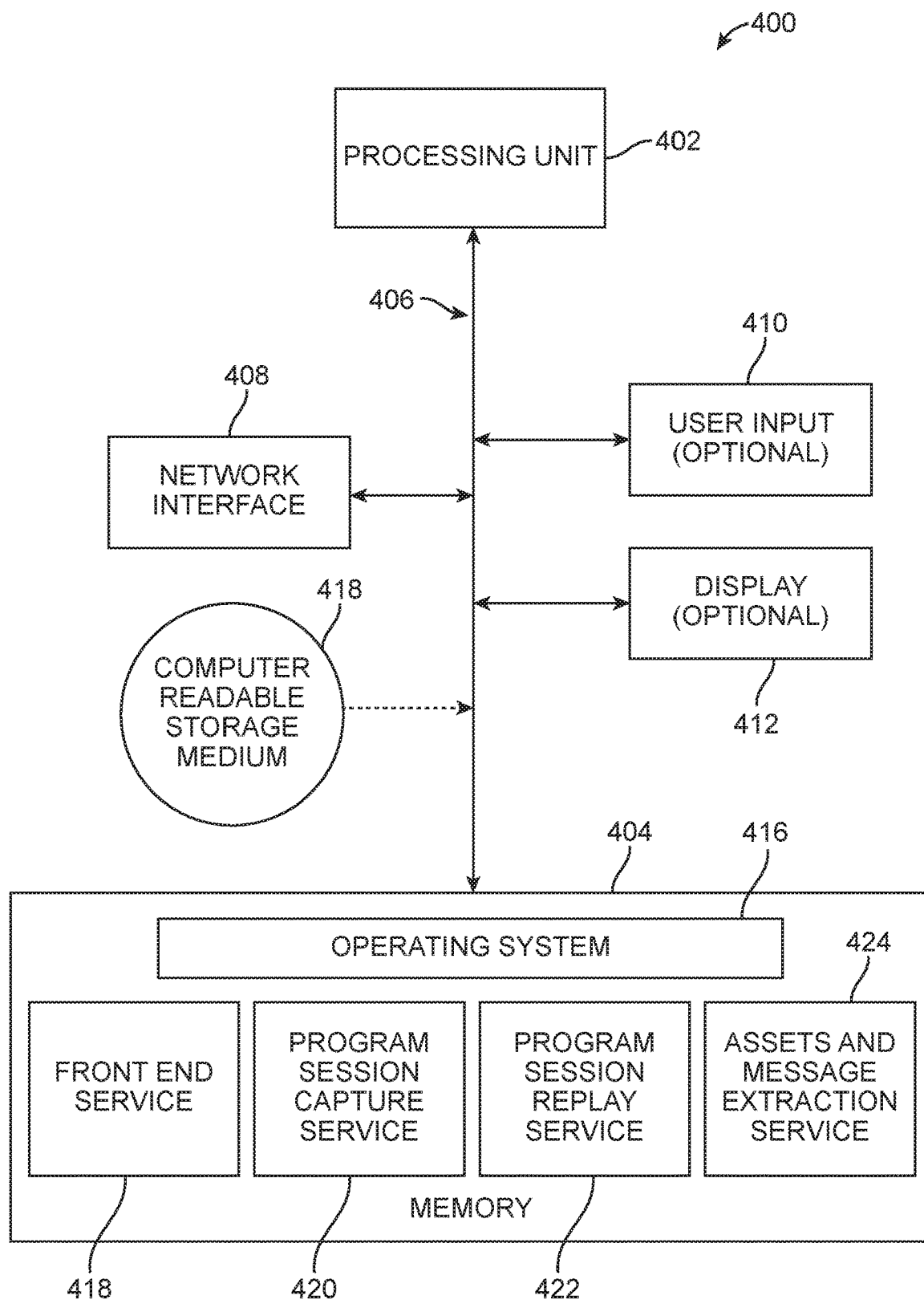
FIG. 4 illustrates several components of an exemplary gameplay session capture/replay server according to one or more embodiments disclosed herein.

Referring to FIG. 4, several components of an exemplary server 400 are illustrated. In some embodiments, a server may include many more components than those shown in FIG. 4, for example, a server may include all of the hardware and software components of a capture device 200 and a replay device 300. However, it is not necessary that all of these generally conventional components be shown in order to disclose an illustrative embodiment. As shown in FIG. 4, exemplary server 400 includes a processing unit 402 in data communication with memory 404 via a bus 406. Memory 404 generally comprises some or all of random access memory (RAM), read-only memory (ROM), and/or a permanent mass storage device, such as a disk drive, flash memory, or the like.

server 400 may also include a network interface 408 for connecting to a network such as network 102 and a user input (optional) 410 (or a user input port for connecting an external user input device) and/or a display (optional) 412 (or a display port for connecting to an external display device).

Memory 404 of server 400 may store program code, executable by processing unit 402, corresponding to an operating system 416, as well as program code corresponding to a front end service 418, a virtual reality session capture service 420, a virtual reality session replay service 422, and an asset and message extraction service 424.

The asset and message extraction service 424 carries out the methods 500, 600, and 700, described below.

These and other software components, as well as various data files may be loaded into memory 404 via network interface 408 or via a selectively removable computer readable storage medium 424, such as an optical disc, memory card, or the like.

In operation, operating system 416 manages the hardware and software resources of server 400. For hardware functions such as network communications via network interface 408, obtaining data via user input (optional) 410, and/or rendering data via display (optional) 412, and allocation of memory 404 to various resources, operating system 416 may act as an intermediary between software executing on server 400 and the server's hardware.

Although an exemplary server 400 has been described, a virtual reality session capture/replay server may be any of a great number of computing devices capable executing program code, such as the program code corresponding to operating system 416, front end service 418, virtual reality session capture service 420, and virtual reality session replay service 422.

Although described above as separate devices connected by a network 102, in some embodiments, one or more of the capture device 200, the replay device 300, and the server 400, may be combined into a single device. For example, the hardware and software of the replay device 300 and capture device 200 may be combined into a single device for capture and replay. Such a device may be connected via a network to the server. Similarly, the capture device and the server maybe combined into a single device that is connected to the replay device via a network. In some embodiments, the software and hardware of the Server may be distributed among a capture device and a Replay device that are connected via a network. In such an embodiment, a server may not be present or used.

Figure 5:
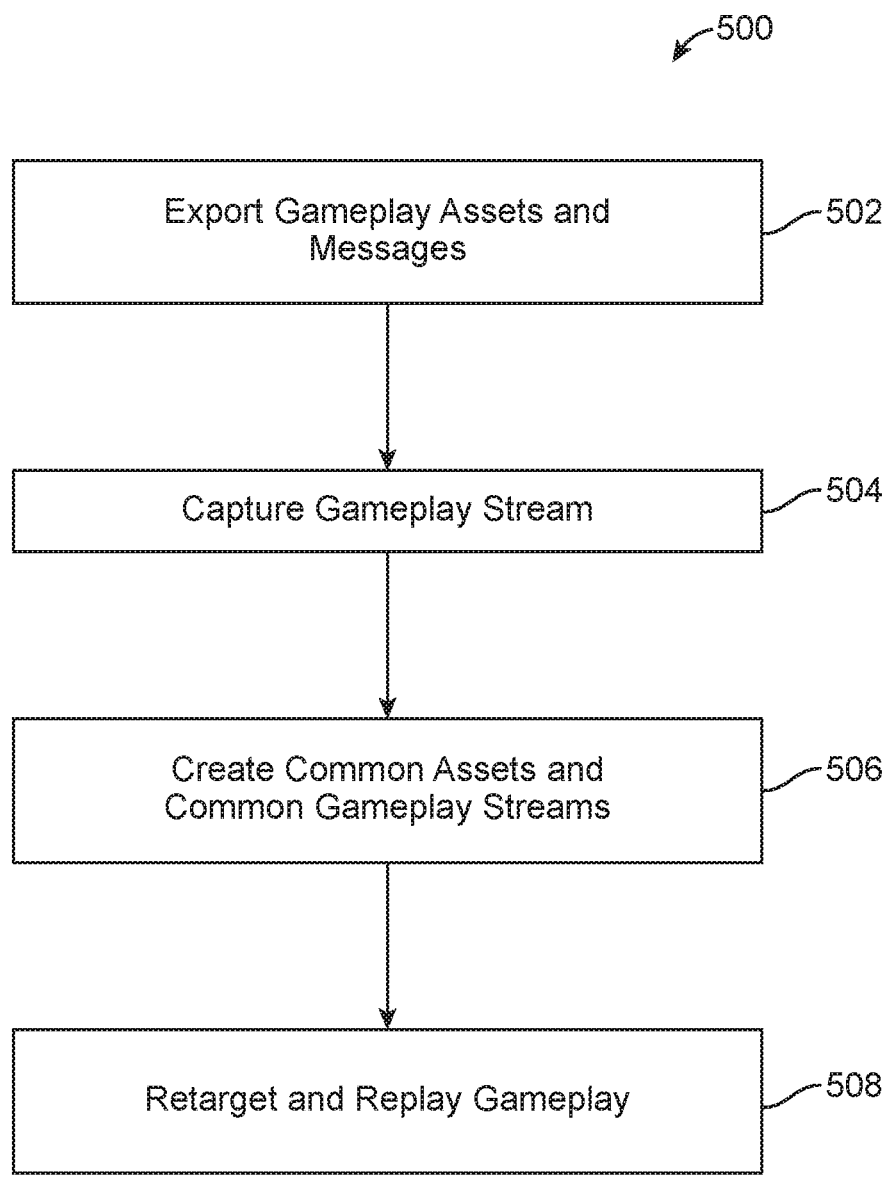
FIG. 5 illustrates an exemplary method of preparing gameplay assets, gameplay data and replaying application sessions according to one or more embodiments disclosed herein.

FIG. 5 illustrates an exemplary method 500 of preparing gameplay assets, gameplay data and replaying the visual, auditory, and haptic aspects of the gameplay session. At block 502 the method 500 includes exporting gameplay assets and gameplay messages from a first platform into a common format. At block 504 a gameplay stream is captured from the first platform. At block 506 a stream manifest of common assets is created from the gameplay stream and a common replay stream is created from the captured gameplay stream. Blocks 502, 504, and 506 may be carried our as described herein with respect to source independent replay of FIG. 16 and the process of method 200 may be carried out in blocks 502, 504, and 506. At block 508, the gameplay common assets and the common replay stream are used to replay the gameplay. In some embodiments, the gameplay common assets and the common replay stream are converted to gameplay assets and a replay stream compatible with a second, different platform by generating assets and messages for the second platform at block 508, and replaying the gameplay on the second platform using the assets and messages for the second platform. In some embodiments, the replay at block 508 is carried out as discussed herein, for example, with respect to spectator and replay clients described with respect to FIGS. 10-15 and source independent replay of FIG. 18.

Figure 6:
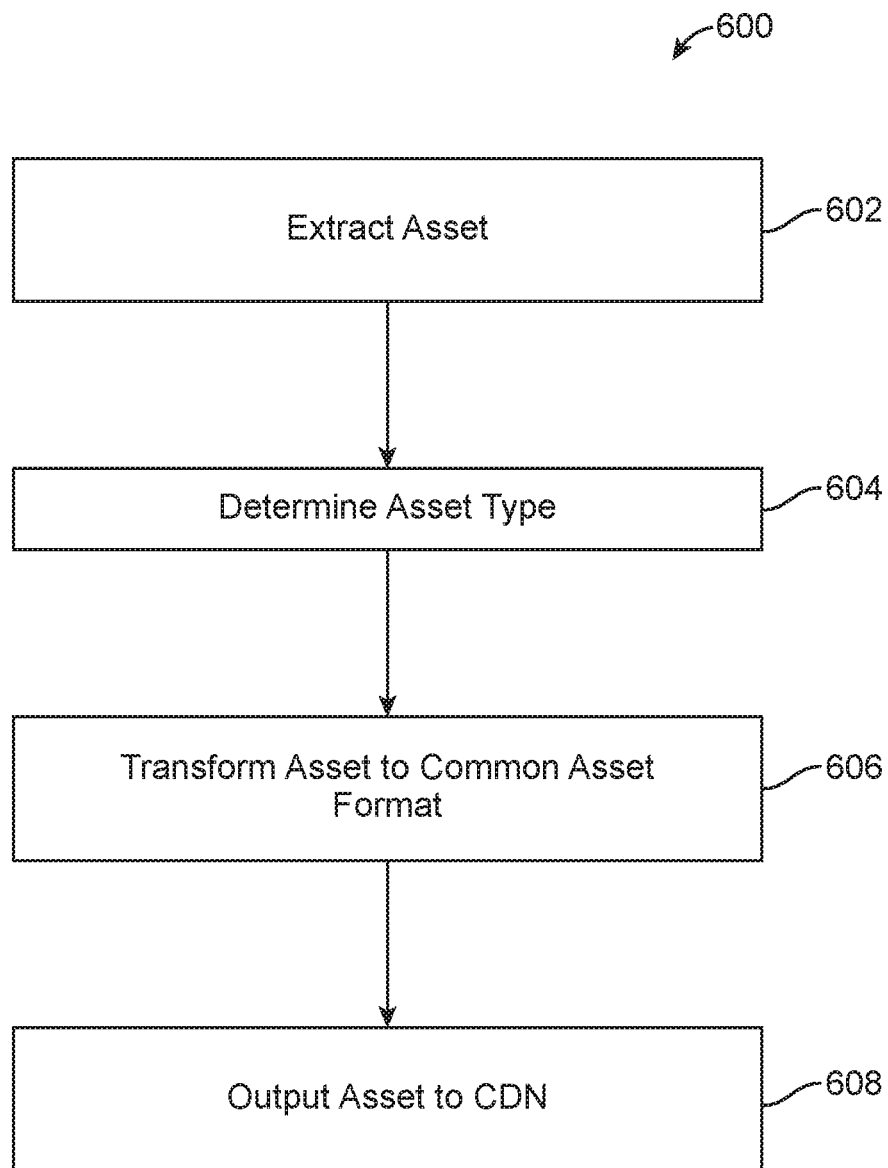
FIG. 6 illustrates an exemplary method for extracting gameplay assets according to one or more embodiments disclosed herein.

In particular, at block 502, the server 400, capture device, or a combination of the two may extract the various gameplay assets from the game. Asset extraction is the process of transitioning assets from one piece of game technology that uses a particular game engine or game application and re-rendering it in a common engine. FIG. 6 shows a method 600 for extracting gameplay assets which may be executed as part of block 502 of method 500. The extraction may be carried out via an asset exporter module, such as asset exporter module 802, shown as part of the message exporter and file format schema 800 of FIG. 8. The asset exporter module 802 may be part of the server 400, the capture device 200, or another device. Replay assets represent the audio and visual and visual elements required to re-render an event stream, which is the stream of function calls sent by the program, such as the video game engine, to the graphics engine to instruct the graphics engine on what and how to display the visual gameplay. Accordingly, such replay assets are not aspects of the gameplay, such as game play logic, user inputs, inputs made by the program to control aspects of the game, such as commands to characters or the physics of objects in the game. Replay assets may also include 3-D meshes, textures, materials, shaders, audio, particle effects, animations and other game elements.

An asset exporter module may be or include an asset editor or source-level tooling. Such extraction may occur on the source files of a game or program without executing the game or program. For example, the source files may be read from memory, such as a computer readable medium, the assets identified, and then assets may be copied and stored outside the source files, for example on the server 400, the capture device 200, the replay device 300, the data store 104, or the asset CDN 808. In some embodiments, the asset exporter module 802 may be a runtime insertion may be used to extract assets. In runtime insertion tools are used to extract the assets during actual game play. At block 602, the gameplay assets are extracted from the game or other program using one or more asset exporter modules which may each use one or more of an asset editor, source-level tooling, or runtime insertion techniques to extract the assets.

Figure 8:
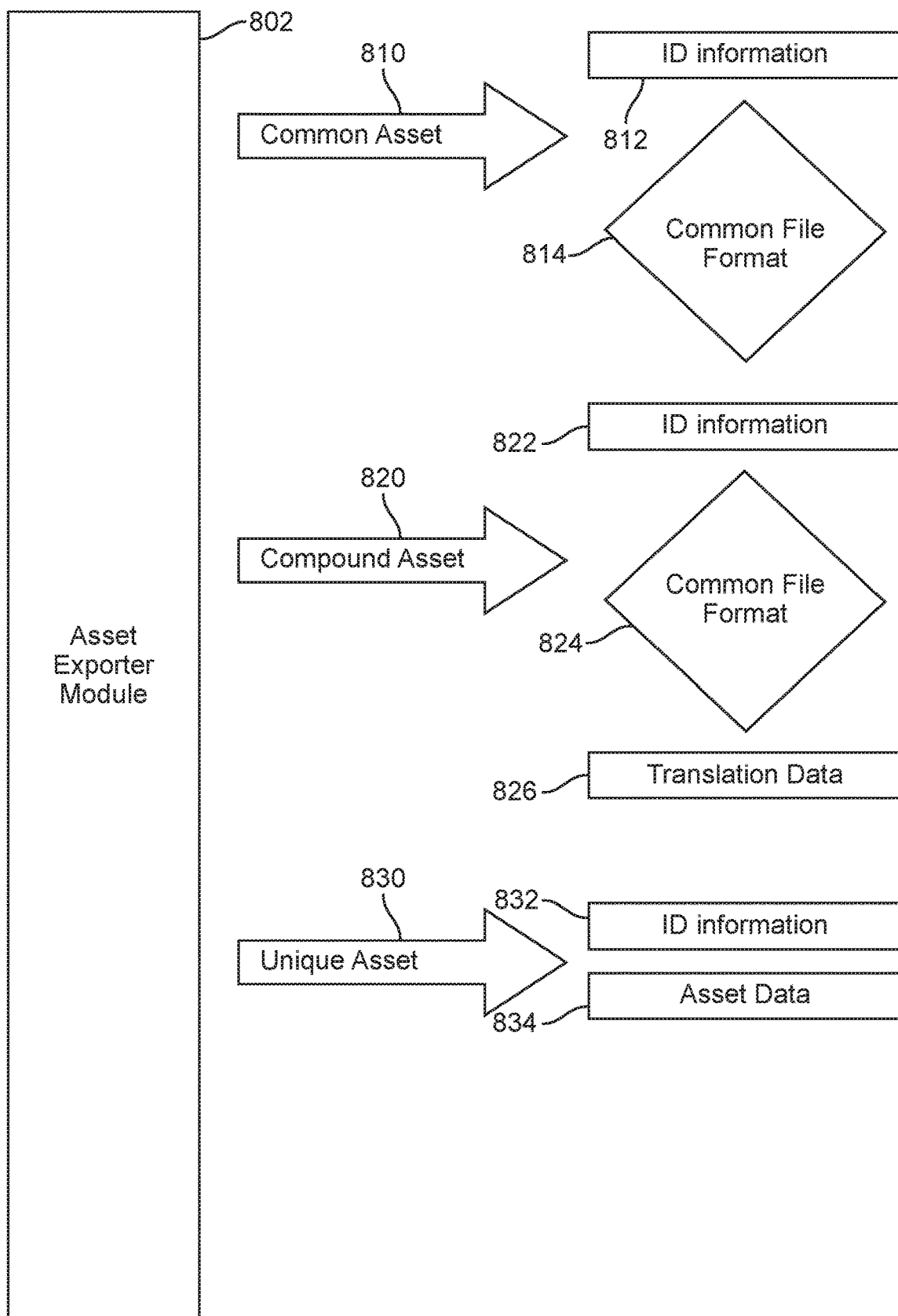
FIG. 8 illustrates an exemplary message exporter and file format schema according to one or more embodiments disclosed herein.

At block 604, each extracted assets is evaluated to determine whether it is a common asset 810, a compound asset 820, or a unique asset 830, see FIG. 8. Each asset is then converted into a common file format at block 606. The structure of the common file format is based on the determined asset type. At block 608 the assets are output to and stored in a content delivery network.

Common assets, such as FBX assets, audio assets, such as WAV files, and video files, such as MPEG files are extracted in their source format and then imported into the playback client. The low-level data for an FBX, such as polygon descriptions, including descriptions of points and vertices, bones in characters and other objects, and animations are common assets because they are exported using the original assets for the program or exported by writing out polygonal data to the common format.

When extracting assets the coordinate space of the assets is unified. Unification of the coordinate space aligns the assets, in some embodiments all the assets, to a single coordinate space. This is carried out because some platforms use a left-hand alignment while other platforms may use a right-hand alignment or other type of alignment. In addition, platforms may use different orientation pivots and scales. Accordingly, each asset's orientation and scale is transformed to a unified description for pivots and the scale is unified.

Compound assets are assets that exist conceptually on two or more platforms, but are described in a non-uniform way or ways on different platforms. Particle systems, animation blend trees, and transition graphs are examples of compound assets.

Compound assets describe pieces of custom technology for a particular platform or platforms, such as animation blending, or are implemented differently on each platform based on the authoring tools and capabilities of the source technology, as is the case for particle systems, for example.

On some platforms a particle system may be described frame by frame, wherein the location of each particle in the system is defined for each frame. Yet, in other platforms a particle system may be described as a series of points and splines with the points moving along the splines over time. In yet another platform, a simple XML description of each individual particle is used by the engine to describe the particle system.

In another example, some animation systems might use blend trees with programmatic inverse kinematics for dynamic movement, while others might just use animation masking and rote-animations.

To enable cross-platform playback, the compound asset is defined in such a way as to recreate different approaches in a way that is close to identical to the source technology.

Translation formats 826 are used and associated with the common file format 824. The common file format 826 describes these compound assets and how they should be re-created by a playback client. Extraction of compound asset information varies per-engine or platform, but translation format 826 for each platform generates a common end-result format for the playback client and for the stored asset on the asset content delivery network, regardless of the originating platform.

As an example, a particle system in one game engine for a particular platform may be described with a handful of global parameters, such as the duration, looping, starting speed, and lifetime of the emitter or particle. Emission and shape modules are used to control the number and shape of the emitters.

In such an embodiment, the translation file describes these parameters as common components. For example, after translation, the common file describes emitter components by how they spawn the particles, physics components by the motion of the particles, lifetime components by the lifespan and scale, color, and collision components describe such aspects of the component particles. The common format therefore describes the visual appearance, motion, and lifecycle of each particle in a way that can be re-created without the original source code or game engine functionality.

Unique assets 830 are assets that exist in one source engine or platform, but do not exist in a common form in the other engines. Unique assets include features such as high level animation blend trees and scenes. While there may be some commonality between unique assets of different platforms, there may be no mechanism or common format to translate between them.

Therefore, unique assets may be exported into a common format that has no direct, one-to-one, correlation between engines. For example, one game engine or platform might describe a game asset with a transform, mesh renderer and mesh filter component. This is asset is actually described as a global/local rotation, scale and position for a visual element, as well as how the asset should be drawn in the scene. Such an asset model is not applicable in the playback client, instead a translation file and id manifest are created to include the object hierarchy and visual appearance from the game engine into the stored common game asset. This is not an asset export, but a recreation of the visual appearance of the game asset in a new logical construct.

FIG. 8 shows the asset export module 802, along with the asset types 810, 820, and 830 and the associated schema of each asset type. Each schema includes a distinct universal ID for each asset. The ID is a fixed and constant identifier that is assigned to each asset, such that if a gameplay recording describes an event where a table with a particular ID is created, that table asset can be retrieved during replay based on the table ID.

Common assets are exported into a common data format 814 alongside ID information 812, such as an ID manifest for referencing the asset or elements of the asset. Other common asset types include elements like static meshes and 3-D models.

Compound assets are assets that have common aspects between platforms but also use translation data to translate some information between the platform description and the common file format, as described above. As an example, a material has a texture and shaders. The texture can be handled as a discrete common file, but the shaders are described per-engine and are translated to the common format. Each compound asset also includes ID information 822.

Unique assets include the asset data 834 that describes the asset and the associated ID 832.

After these assets are exported with their translation and id manifests, they can be imported into the replay engine where they are repackaged as discrete assets. Each of these assets is associated with an ID. Using the extracted assets, level of detail versions can be generated as needed, as well as both compound and simplified stand-in objects. This allows discrete downloading and loading of every asset for a replay.

Figure 7:
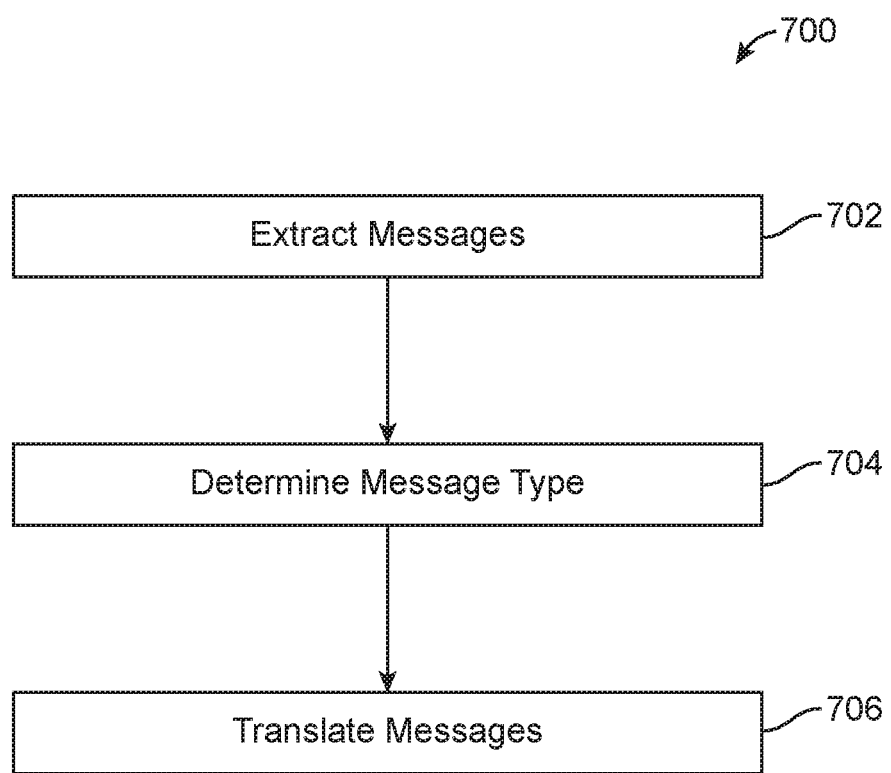
FIG. 7 illustrates an exemplary method of extracting and translating application messages according to one or more embodiments disclosed herein.

The replay of the visual aspects of the game session is actually a replay of a collection or stream of messages along with the associated assets. Method 700 in FIG. 7 describes an embodiment of a method of extracting and translating messages, which may be carried out at block 502 or 504 of method 500. Like the assets, the messages are also converted from a platform or game engine specific format to a common format. At block 702 messages are extracted from the game or application in a manner similar to that described above with respect to assets. Also similar to the assets, messages have different message types. Messages are either common or approximate. At block 704 the type of message is determined.

Common messages are messages that can relate many-to-one from the source engine to the replay client. The relationship is many-to-one because each engine handles similar assets differently. For example, some engines may use translate exclusively for movement, while others may use global or local positions to show asset movement. Different engines may also use a different coordinate space. So movement and coordinate spaces in messages are converted to a common format for the playback client.

Such common messages can be converted to a set of common messages that define the object's location, material properties, and other aspects of the object. For example, the common instantiate object message may include all of the aspects of the various instantiate object messages available in a game or program.

In some embodiments, a message may trigger the playback of a sound via a WAV file. While each engine may send different types or formats of messages to play the WAV file, the converted common message enables the conversion from one message of a given platform through the playback client to a second massage for a different platform.

In some embodiments, some messages are approximate messages that approximate the original message during playback. Particle systems are good examples of an approximation. Using messages related to particle system, the playback client attempts to recreate the state of a particle system, but because the system and timings between the original gameplay and the replay via the replay client are fundamentally different, the particle state may not match the recording 100%. However, the replay messages approximate the original gameplay messages such that the replay of the particle is practically indistinguishable to the viewer due to the overall scene complexity and general lack of gameplay impact for physics driven particle systems.

Similarly, animation blending and flow will give a similar end result, but because of the variable timing between the game play and the replay, the replay may be different than the original game play, though the differences are imperceptible during normal replay conditions.

This is a deliberate approach, and something that is fundamentally different from replay systems. Existing replay approaches replicate gameplay using the same game-code or logic. However, as disclosed herein, the messages and assets have less data, and are lossy, but because the approximation is so close, the user is unaware of the shortcuts and approximations taken. For example in some embodiments, the replay event occurs within 5 to 15 ms of the original timing of the gameplay.

At block 706 translation schemes are determined for each message. The translation schemes translate between the messages of a particular platform and the common message format.

Figure 9:
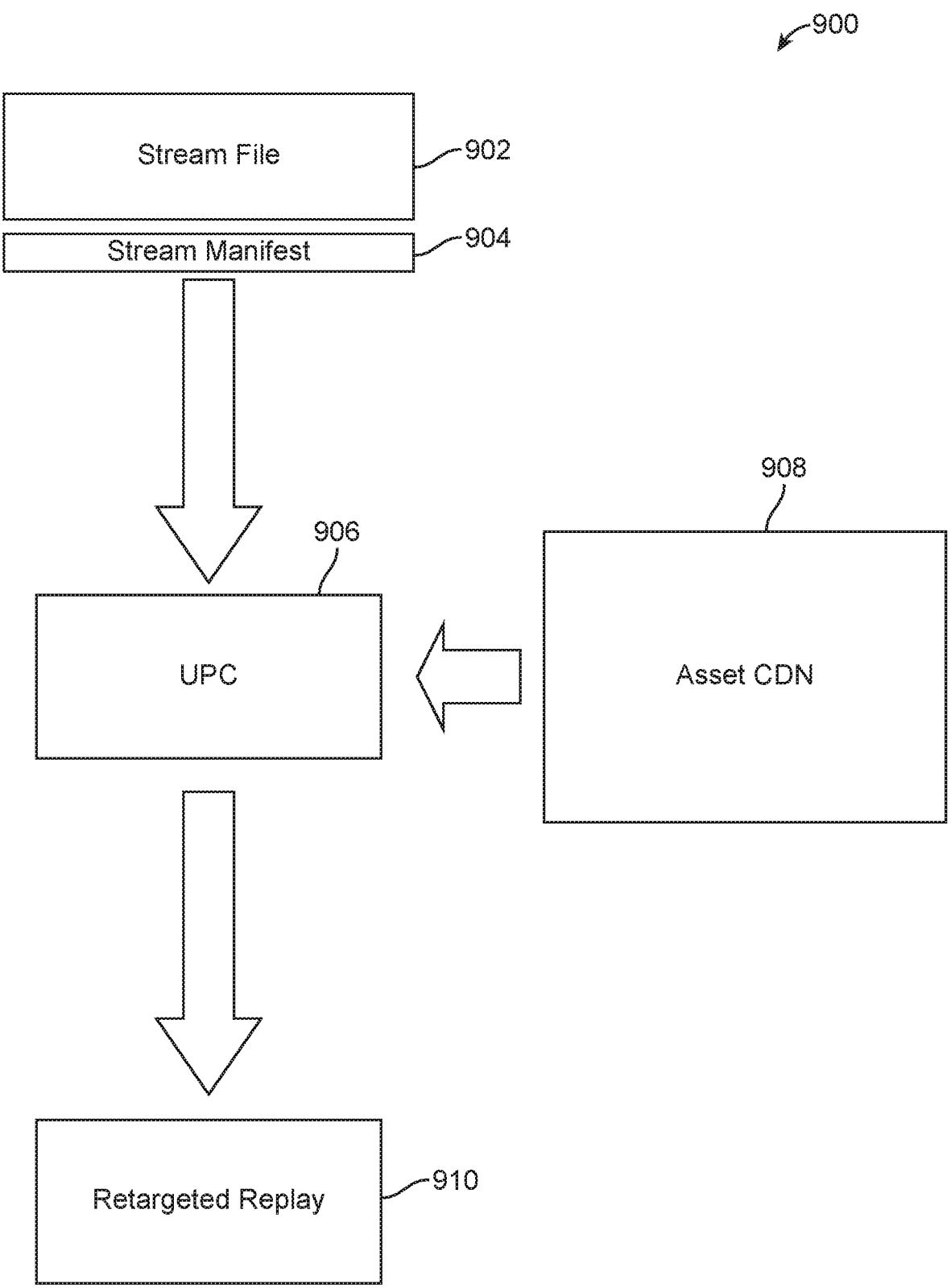
FIG. 9 illustrates an exemplary data flow for session replay according to one or more embodiments disclosed herein.

FIG. 9 shows an example data flow for gameplay playback using the common assets and messages described above. When a previously recorded message stream is selected for playback, the playback client 906 receives initial handshake data, a stream manifest 904, and a stream file 902. The stream manifest 904 is a time-organized set of assets that are called by for playback by the stream file 902. The stream file 902 is the common format of a recording of the game messages sent from the program, such as the game engine, to the graphics engine. The assets are time organized within the manifest to enable the playback client to sequentially load assets over the network so that play back may start without waiting for non-essential assets, such as assets that are not used until much later during playback. Assets are loaded on-demand as time progresses. The stream file is the message stream generated by the game engine or platform during the original game play converted into a stream containing messages converted according to the conversions established based on the method 700, described above.

When the playback client 906 receives the manifest data 904, it queries the asset in the content delivery network 908 and retrieves all of the assets to start the replay. Once the initial content is retrieved, replay begins.

The initial frames of the replay are used to recreate the gameplay world-state and the loaded scenes are re-created by the playback client from the stream. In some embodiments, the replay client instantiates all static meshes, recreates the shaders and lighting, and sets up the world state and object lookup tables used to map messages to specific objects.

During the instantiation process, rendering overload shims for custom rendering engines are also loaded. Because the playback client may not have the same rendering or shader model for each engine, the shims override the core playback lighting and rendering model to enable replication of specific visual materiality that would otherwise be impossible with a fixed rendering model. For example, shims may be used to implement game or rendering engine specific surface reflection or atmospheric light scattering models.

Once the shims are loaded and the instantiation process is complete, the playback client beings the game replay using the messaging stream file 902.

In some embodiments, instead of or in addition to playing the replay, the playback client may also retarget the stream to another platform at 910.

The methods described above to export and convert messages and assets to common types may be a two way conversion, such that a first conversion definition between a first platform and the common platform may be used to convert from the first platform to the common platform while a second conversion definition between a second platform and the common platform may be used to convert from the common platform to the retargeted second platform. These assets and messages can then be used replayed using the same or different playback client, but compiled to a different platform.

For example, a VR replay can be retargeted to an AR mobile device simply by retrieving a different set of source assets Virtual Reality Replay Shadow Clients Disclosed herein is a client, such as a video game client or virtual reality client, which runs the session, such as a game session or virtual reality session as well as extracts and records the session data, sometimes referred to as replay data, for session replay, either concurrently with the session or after completion of the session. A spectator client consumes the session replay data and aids in re-rendering the session, but with the autonomy of the spectator. The spectator can move their point of view around freely in the re-rendered world and can place cameras in a scene within the replay. These cameras can be used as a point of view to export session data from a particular point of view. The export may include data, such as a 2D video feed, including both live and recorded feeds. The export may also include a stereoscopic or monoscopic 360 camera view, or any other renderings, either 3D or 2D.

However, rather than having the spectator client re-render each camera's point of view, the rendering and exportation of data may be carried out by shadow clients that are under the control of the spectator client or another client, such as a web client.

Figure 10:
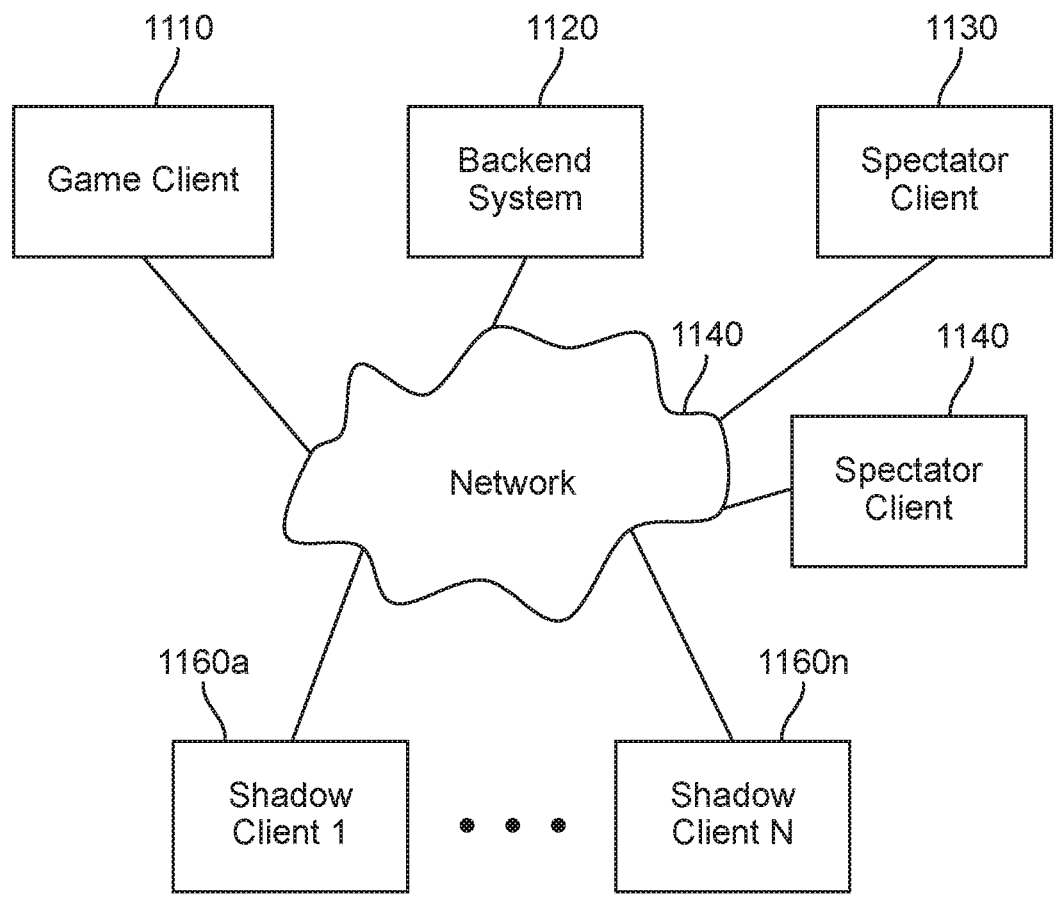
FIG. 10 illustrates a session capture and shadow client replay system according to one or more embodiments disclosed herein.

FIG. 10 illustrates an exemplary session capture and shadow client replay system 1100 in accordance with one or more embodiments herein.

A client, such as game client 1110, may be a video game client or virtual reality client, such as client 200, that executes a session, such as a game session or virtual reality session. The client may execute the program that generates the session. For example, the game client 1110 may execute a playable game, receive gameplay inputs from a participate, determine the consequence of such inputs, determine the scene of the game for rendering by a graphic engine, and otherwise carry out the functions and actions that enable a person to play a video game. In other types of session, such as a virtual reality session, the client receives inputs from a participant, determines the what the virtual environment looks like, enables the participate to navigate the virtual scene, plays the sound effects for the scene, and carries out the other functions and actions that enable a person to participate in a virtual reality session. The client 1110 also extracts and records the session data, sometimes referred to as replay data, for session replay. Session or replay data may include gameplay assets, gameplay data including the visual data, auditory data, and haptic data of the gameplay session. Aspects of extracting and recoding the session data is described in U.S. application Ser. No. 15/057,003, which is hereby incorporated by reference in its entirety.

The system may include a backend system 1120 which may be a virtual reality capture and replay server, such as described with reference to FIG. 4 herein. The backend system aids in both session capture and session replay. For example, the backend system may receive the session stream from the client and convert the session stream to a replay stream, which may include extracting assets, recoding graphic engine function calls, and other tasks, for example as described herein.

The system 1100 may also include a spectator client 1130. The spectator client 1130 reads replay data and re-renders the game replay, but with the autonomy of the spectator. For example, they can move around freely in the re-rendered world. This spectator can place cameras in the world, such as cameras 1132, 1134 of FIG. 12. The cameras, which can be thought of a virtual camera placed in the virtual world of the replay session can be used as a basis for rendering and recording the session though the virtual point of view created according to the aspects of the virtual camera.

The network 1140 may be a LAN, WAN, internet or other type of network that connects each of the various part of the system 1100 together in electronic communication. The network 1140 may include servers, routers, switches, and other network devices and services to facilitate transfer of data, including session data, control data, commands and other communication between the various parts of the system 1100.

The system 1100 may also include a shadow coordinator 1150. The shadow coordinator 1150 may be network service and although depicted as residing on the network 1140, aspects of the shadow coordinator 1150 may reside on one or more of the client 1110, backend system 1120, the spectator client 1130, and the shadow clients 1160. The shadow coordinator 1150 aids the rendering of replays by coordinating the startup of shadow clients and transfer of replay streams and replay control information between the spectator clients and the shadow clients, as described herein.

The system 1100 also includes one or more shadow clients 1160, labeled shadow clients 1160a though 1160n. Shadow clients replay the replay stream and re-render the session from the point of view of a camera placed and controlled by the spectator client. The spectator clients 1130 and shadow clients 1160 may be as described herein with respect to replay device 300 with additional features for each, as discussed below and elsewhere herein.

The number of shadow clients in the system may be based on the number of cameras placed by the spectator client and the type of output for each camera. For example, a system may include two cameras, each camera designated to render a 4K 2D video and a monoscopic 360 degree video. In such a case, the system may include four shadow clients 1160, two for each camera, one shadow client rendering the 4K 2D video and the other rendering the monoscopic 360 degree video. In some embodiments, a single shadow client may render multiple cameras or multiple outputs for a single camera. In some embodiments, multiple shadow clients may render a single camera and output, for example, each view point in a stereoscopic 360 video may be rendered by a separate shadow client.

The shadow clients are executed on hardware separate from the game client. Accordingly, the shadow clients can use their compute power in a different way without impacting the spectator experience or game play experience. This allows real-time or near real-time generation and exportation of game sessions such as 4 k×4 k panoramic videos and 60 fps 4 k real-time video feeds to destinations like YouTube. This is because we the system does not use the VR spectating computer or the gameplay computer to render the video feed.

Typically rendering the game from multiple locations requires significantly more GPU and computing power. By moving this to a different machine, not only can the system re-render without this overhead, they system can do it in real-time, as if the spectator had one giant computer responsible for rendering the game at multiple locations.

Figure 11:
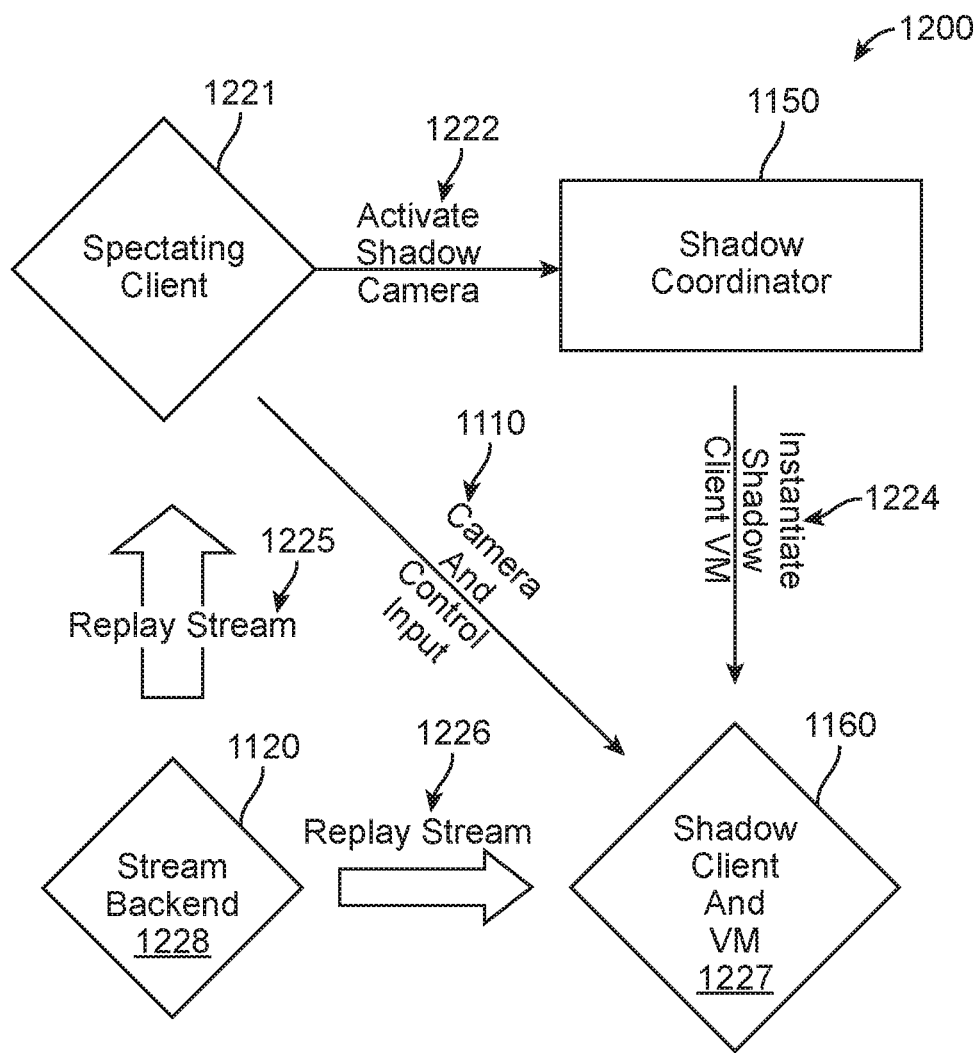
FIG. 11 illustrates a data flow and process for shadow client replay according to one or more embodiments disclosed herein.
Figure 12:
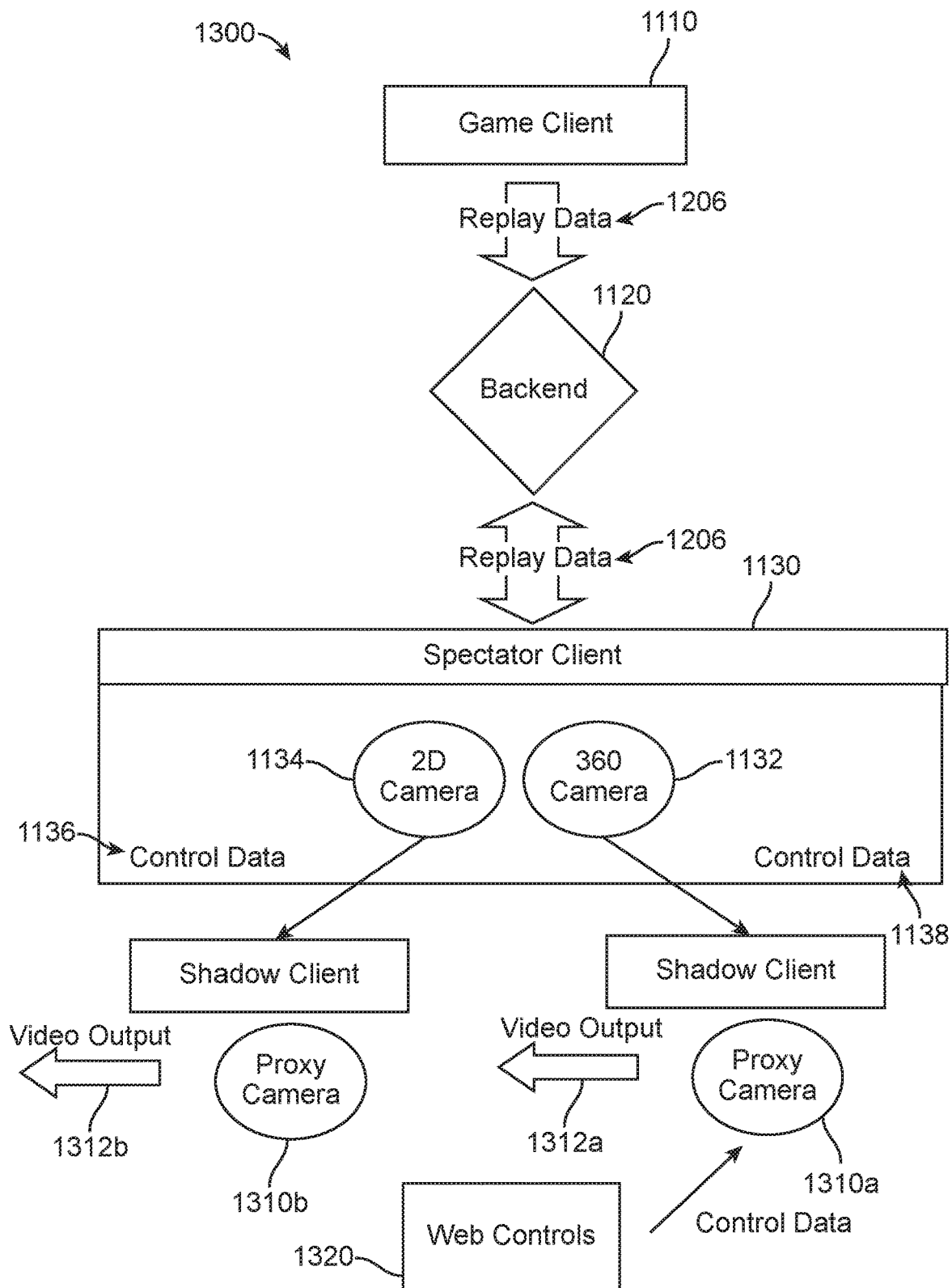
FIG. 12 illustrates a data flow and process for shadow client replay according to one or more embodiments disclosed herein.

FIG. 11 depicts the data and process flow 1200 for starting and controlling a shadow client. Starting a 1221, a spectating client, having received a replay stream, places a camera within a scene within the replay. When placing the camera, the camera may be given attributes, such as location and orientation within 3D space in the scene, field of view, rendering output settings, motion settings, such as camera actions like pan and tilt, dolly movements, and other settings. Based on these attributes a shadow camera 1132, 1134 in FIG. 12, is activated at 1222. The attributes may be set or determined by, for example, virtually placing a camera in the scene, triggering a UI, or some other active player or spectator action.

At block 1223, in response to activating a camera, a network request is sent to the shadow coordinator. The request includes the attributes of the camera and may also include replay stream information, among other data. At block 1223 the shadow coordinator verifies the ability to activate a shadow camera in the case of a subscription service and coordinates communication between the instantiating client and the shadow client. At block 1224, the coordinator instantiates both a shadow client virtual machine and an instance of a shadow client replay session on the virtual machine. In some embodiments, the client is instantiated with a different set of credentials, in this case, supplied by the coordinator based on the spectating client.

At block 1227, the shadow client and the virtual machine connect to the same backend system 1120 to receive the replay stream 1228 via connection 1226. The replay stream 1228 may be the same replay stream that is being sent by the backend 1120 to the spectating client at block 1225. Sending the same replay stream to both the shadow client and the spectating client allows the shadow client to synchronize to the same replay data as the spectating client.

Once the shadow client is stared up and the data streams are connected, at block 1229 a control connection between the spectating client 1130 and the shadow client 1160 is established. This control connection is a set of data used to control the proxy objects, such as cameras, on the shadow client.

FIG. 12 depicts a simplified data flow 1300 between elements of the system 1100 before and during replay using a shadow client. The replay data 1206 is generated, in part, by the game client 1110 and sent to the backend system 1120 for storage and further distribution to spectator and shadow clients. During live streams, wherein the replay of the session begins before the end of the game session, the replay data 1206, in the form of a replay stream, is sent to spectator clients 1130 during the game session. During post session replay, wherein the replay of the session begins after the end of the game session, there replay data is stored on the backend system until after the game session ends and is then retrieved and transmitted to the spectator clients 1130 for replay.

The spectator client 1130 places and instantiates cameras, for example, cameras 1132, 1134 within the scene or scenes of the replay session. After instantiation and of the shadow clients 1160a, 1160b, control data 1136, 1138 for each respective camera 1132, 1134, is sent to the respective shadow clients 1160a, 1160b. Wherein a proxy camera 1310a, 1310b for each respective spectator camera 1132, 1134 is instantiated. The shadow client then renders the replay session from the point of view of the proxy camera and outputs the rendering 1312a, 1312b, in a format specified by the spectator client.

The shadow client visual output is may be sent directly to display, such as a video monitor or VR headset. In some embodiments, the output is captured and exported to an external destination, such as recording the video output to disk, or exporting to a video service, such as Twitch or YouTube.

Figure 13:
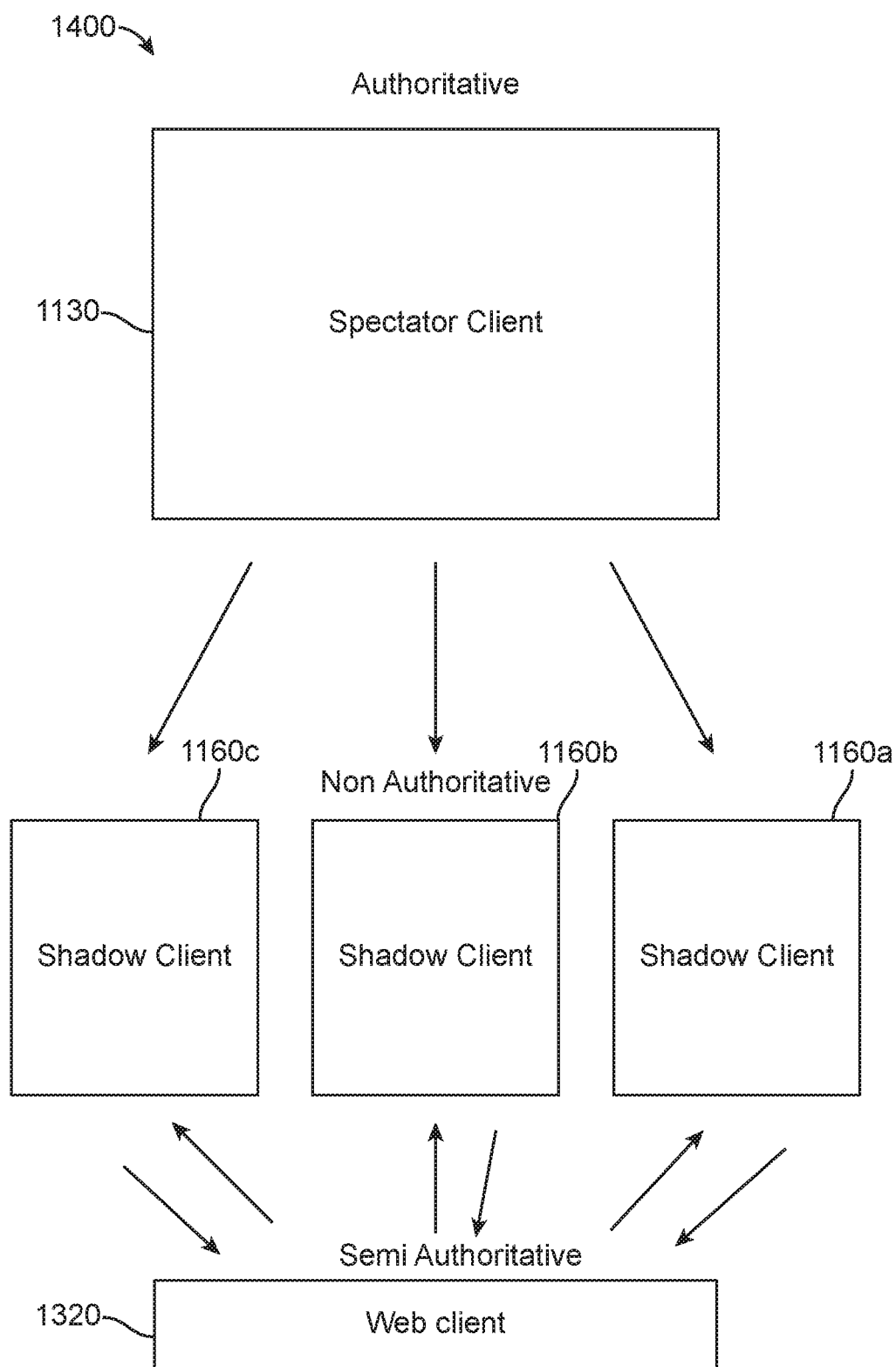
FIG. 13 illustrates the replay control authority according to one or more embodiments disclosed herein.

FIG. 13 depicts a diagram of authority 1400 with respect to the elements of the system 1100. A camera or other shadow object exists on both clients, however, such objects should only be modifiable by a single instance. The modifiable instance of an object resides on the authoritative client for that instance, in many embodiments, the authoritative client is the spectator client. This means that any change can only originate on the owning client, and is then sent out via camera and control data to the remote shadow clients.

Although the shadow clients 1160 are running the full replay stream, they are not authoritative, rather, they are subordinate or puppet clients. Rendering or camera objects that are instantiated by the spectator client are instantiated on the shadow clients. These cameras are not controlled on the shadow client, but instead receive control data from the spectator client.

This control data can be movement commands, zoom, screenshot or other visual commands such as post-processing effects, clipping planes, and specific commands to not draw some objects, among other camera and rendering commands.

In addition to receiving control input from the spectator client, the system can also include a remote non-game and non-vr input client. For example, a video producer or cameraperson could be using a remote machine with a browser or external client, such as a web client 1320. This client may be connected to the same replay backend as the spectator client and authenticated either as the spectator or a proxy of the spectator. This in turn causes a connection to be established between the web-client and shadow clients.

The web-client can then issue commands to the shadow-client cameras. Rather than being in VR and moving a camera around, for example as discussed above with respect to a spectator client, a web-client user can use a web-based UI to click buttons to cause the cameras to pan and move the camera. Instead of a fully rendered 3D world for the camera, a real time camera view is exported to the web-client. This allows the system to externalize control inputs to the shadow clients not just to replay clients, but any client or software that can send events over the network 1140 to the shadow client. As another example, a mobile phone could send its gyro (3D orientation) information to the shadow client, and the phone's 3D orientation can be used to rotate the camera based on the tilt of the physical device.

In this way, a spectator client can place down 10 2D cameras and program movement splines, dolly tracks, and rotational constraints on these cameras. Then 10 shadow clients will be instantiated. These clients begin rendering live output from these cameras.

A web client user can then connect to the backend and to the shadow clients. The web-client will begin rendering the video output of these cameras, as if they were physical cameras placed at a sporting event. The web-client operator can then do the work of multiple camera operators, all exporting live video feeds to a streaming service or to a dedicated video or editing board, for example, to mimic the production of multi camera live video broadcasts.

In addition to the real time and simultaneous replay discussed above, the system can use a time-shifted shadow client to render and capture extremely compute intensive stereoscopic 360 captures based on real-time camera movements from the spectator client.

Typically stereoscopic 360 captures operate at a very low framerate, on the order of seconds per frame because of the image processing used to render each frame. These types of renderings use either pre-defined camera motion or a fixed camera location. However, with the use of shadow clients, a spectator using a spectator client can watch the replay in real time and make adjustments to the cameras, such as moving them within the scene as if they were real time cameras, but the actual resulting output may be rendered later (time-shifted and delayed) on the shadow client. For example, the spectator can implement dolly movements, place camera's in advance, and move camera's around in real-time. The production turnaround on this method of capture is now only limited by the rendering time for the panoramic capture.

Figure 14A:
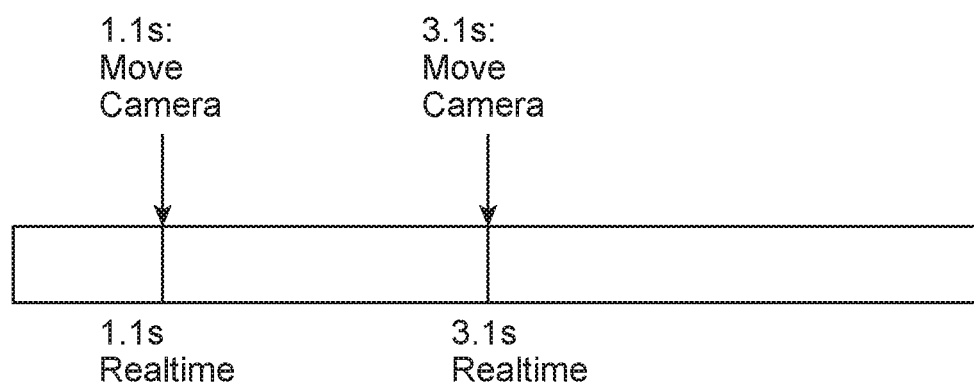
FIGS. 14A and 14B illustrate a timelines for time-shifted shadow client replay according to one or more embodiments disclosed herein.
Figure 14B:
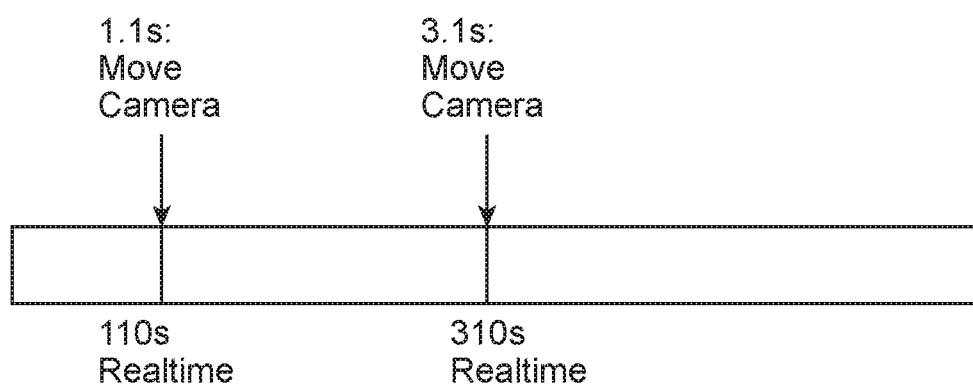

FIGS. 14A and 14B show the differences between the real-time replay and the delayed replay. FIG. 14A is the real-time spectating timeline. Real time and session time are the same in this situation, such that an event that occurs at 1.1 seconds in the replay session (session time) happens 1.1 seconds after the replay begins (in real time). For example, in this case, the spectator moves the camera at 1.1 seconds and again at 3.1 seconds. Time passes in real time for the replay and in session time for the spectator, such that both movements happen in the same time.

The camera control data, including the camera movements, are transmitted to the shadow client and in this case the shadow client is able to render each individual frame in less than the time between frames. The shadow client's replay time lines up with the spectator client's replay in both playback time and real time.

In FIG. 14B, a delayed and computationally intensive rendering timeline is depicted. The camera control data, including the camera movements, are transmitted to the shadow client. However, in this case, the shadow client is spending significantly more time to render each individual frame. The shadow client's replay time lines up with the spectator client's replay time, but when experienced in real time, the rendering takes significantly longer.

The event that happened at 1.1 seconds for the real time spectator happens at 1.1 seconds into the replay for the shadow client, but when looked at in real processing time, it took 110 seconds of processing time from the beginning of the replay on the shadow client. During playback of the replay session, the camera movements appear to occur at the 1.1 and 3.1 second times, but it takes 110 and 310 real time seconds to compute the playback, accordingly, the playback by the shadow client is delayed.

This is because each individual frame is taking 100 times longer to render on the shadow client, however, when replayed in the final video recording, the recording of the replay session takes the same time as the real-time replay.
Source Code Independent Virtual Reality Capture and Replay Disclosed herein is a gameplay client, such as a video game client or virtual reality client, which runs a session, such as a game session or virtual reality session. As described herein, the client's function calls are intercepted and stored for replay. A replay client, which may include a stripped down version of the gameplay client, replays the intercepted function calls to generate a replay of the visual, audio, and haptic events that occurred during the original gameplay session, without of the gameplay client. Furthermore, although discussion is described with reference to DLLs, it is understood that the embodiments described herein apply to other library types, such as CILs.

Figure 15A:
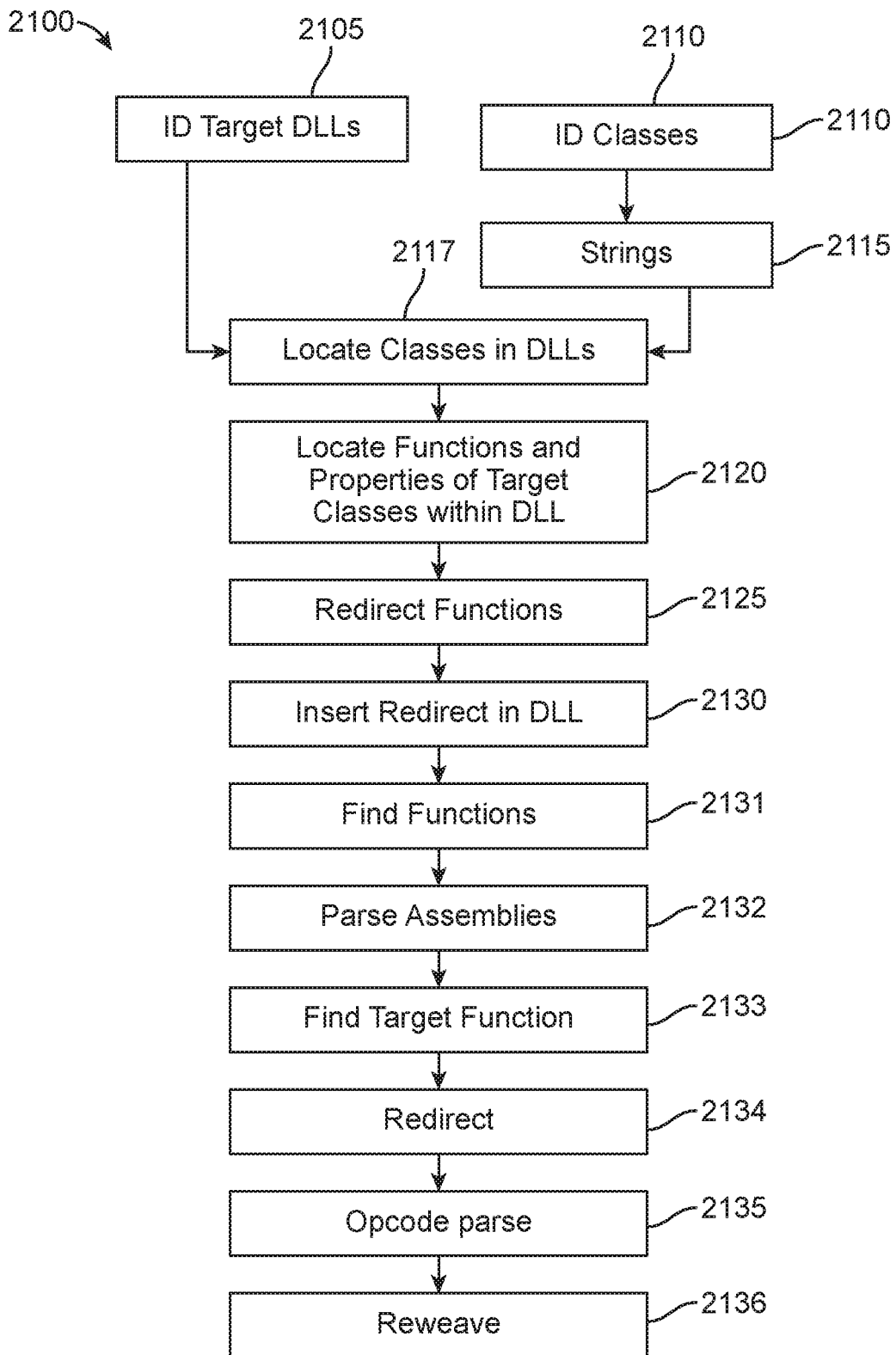
FIG. 15A illustrates a method of modifying program operation for recording sessions according to one or more embodiments disclosed herein.

FIG. 15A illustrates a method 2100 of modifying program operation for recording sessions according to one or more embodiments disclosed herein. The program may be a virtual reality application, such as the program 234 of virtual reality application 220 of gameplay system 200. Many applications use DLLs and CILs to generate a session. DLLs are a mechanism for one or more programs to share code and data. This allows multiple programs, multiple versions of programs, and even different parts of the same program, to shared code and data and to upgrade or change functionality without the applications or parts thereof being re-linked or re-compiled. During a session, a program or application (the terms are used synonymously) makes function calls to DLLs to execute various aspects of the session, such as graphics rendering, playing sounds, and other aspects of the session's gameplay. In order to record the session without interrupting the session, the function calls are recorded by intercepting the function call, saving the function call, including the parameters passed with the function call, and then sending the function call to its intended target so that the session is still properly generated for the user, despite being recorded.

The method 2100 may begin at blocks 2105 and 2110. At block 2105 the target DLLs are identified. The DLLs may be identified by monitoring the program during operation, by registry entries related to the program, and other methods such as filename, directory or CRC. At block 2110 the classes that are to be monitored are identified. The classes may be related to graphics rendering, audio playback and generation, haptic feedback, and other game session elements and attributes. Classes may be determined based on known naming conventions for one or more rendering engines associated with the program. In some embodiments, a pre-defined set of classes, a dynamically generated memory map. In some embodiments, the memory map may be built based on observation of the operation of the program. A set of strings may be created from the classes. The strings may be based on, for example, the specific graphics engine classes used by the graphics engine such as mesh renderers of a particular graphics engine, shaders and materials, audio sources for a particular program, etc.

After assembling the set of strings, at block 2117 each of the classes related to session recording and playback are identified within the set of target DLLs. The method may include searching the DLLs for each string identified at block 2115 and storing the location of each class identified.

At block 2120, the classes identified at block 2117 are parsed. The parsing may include determining the location of each function and the properties of each of the targeted classes. In some embodiments, block 2120 may include filtering of the parsing results, for example, filtering may include removing function and properties related to recursive event tracking, and other functions not related to functions and properties accessed by the program that generates the session. The filtering may be also store only the functions and properties that are accessed by the product that generates the session. In this way, the filtering may be either exclusive, such that it excludes certain functions and properties for the parsing results, or inclusive such that it extracts certain functions and properties from the parsing results. The filtering of the parsing results aids in avoiding recursive event tracking to prevent both excessive message traffic and infinite loops. The parsing may output a list of all classes, types, functions, and properties used in recording and replaying a session.

After a list of all classes, types, functions and properties are determined, at block 2125, redirectors are generated. A redirector is a function that ingests the pertinent information about the function call, such as the function name, input and output parameters, such as variables and other information passed to the function, and datatypes of inputs and outputs of the target function and then redirects that information to another process. For example, in some embodiments herein, the redirector passes the information to a serialization thread. The serialization thread converts the function data into a serialized format for storage or to send over the network. The serialization process operates as a separate thread from the program so as not to impact the rendering or direct gameplay performance of the source application.

FIG. 15B shows an example of a redirector. Redirector 2140 includes a function designation 2142, a function pass-through 2144, a record determination step 2146, an ID verification step 2148, bad data determination step 2150, and a push step 2152.

The first line denoted by "VRLRedirector" is the function designation 2142. The function designation 2142 designates the identified function as a function for interception and redirection. The attribute tag within the function designation 2142 contains information about what kind of function the redirector is looking for, as well as where to find it.

The next line follows with a function declaration, followed by the pass-through function 2144 that passes the redirected function to the appropriate target. For example, the original function may be passed to the target game engine to preserve the original functionality of the source game engine. Immediately passing the function reduces or eliminates possible interruptions of the product developers logical or functional intent, even while intercepting the function data.

After the function is passed through to the target, a record determination step 2146 is carried out. Here, the method determines whether the function and its parameters are data that should be captured and recorded for session recording and replay. In some embodiments, record determination is carried out by analyzing the state of the application, the nature of the object and message data and covers a number of checks on the data and messages. For example, the data may be checked to determine whether it has changed during operation, changed data may be recorded. For example, many programs call functions every for every rendered frame with identical data, and then let the game engine decide if something should happen. For example, if a racquetball is on a floor in a game, the program might be configured to set the position of the racquetball to the same location ever frame, even if there is no force being applied to it. Such a configuration does not do anything to the racquetball during actual game play, because the ball stays in the same location, however such a configuration generates a duplicate data for the recording. Instead of recording every function call, where the ball stays in the same place, during the record determination step, the data is checked to determine whether it has changed. If it has, then the function call and associated data is recorded, otherwise it is not.

In some embodiments, the program might generate an object where data changed, but is not recorded or sent over the network. For example, some items may be executed on the replay client as well as the recording client, such as instructions for client-side effects that happen every frame, but have no state change driven by gameplay instructions. A space game may have distant asteroids that rotate slowly and cannot be interacted with. Rather than send any information or track them at all, this functionality may be replicated on the replay client side.

Next, an ID verification step 2148 takes place. When recording function calls and associated parameters, objects that are passed to the function are recorded, and their validity is determined. For example, the ID verification step 2148 may include looking up existing object IDs to make sure there is a registered object associated with the object ID to both send and receive the source data.

Next, a debugging step 2150 is carried out to check for bad data.

Next, push step 2152 pushes the data to a recording or transmission function. At step 2152, the data is pushed into a queue which transitions it to a serialization thread where the data is serialized and then either stored or sent over a network and then stored remotely. In some embodiments, the serialization thread uses a flatbuffer schema to turn the message into raw bytes for transmission. Flatbuffering allows versioning and schematized networking data across multiple languages and provides for ingestion of the data across multiple technologies without rewriting the network protocols.

Some of these redirectors 2140 contain optimizations to filter out unnecessary or duplicate data before the serialization step. For example, some game code sets the position of objects to 0, 0, 0 every frame, either because it is a desired behavior, or by mistake, however, such game code does not alter the performance of the game itself, but recording these calls generates an excess of network data. Accordingly, before the serialization step, deduplication or no-effect filter detects and removes such data, even when the function is a function that was previously determined to be recorded.

Redirectors 2140 for some functions may include additional handling. For example, in some projects, a call to get_material not only retrieves the target material used to texture the object, but also instantiates a copy of that material and assigns it a unique ID. The session generating program may do this internally as a convenience for the developer to allow modifications to the source material without affecting every single object using the material. Accordingly, when accessing the material, the game engine duplicates the existing material into a material instance. The material instance is a material that is specific to the object it was originally on and allows changes, such as coloration or shader parameters without disrupting other instances of the material. This new material object may cause the redirectors to assign it a unique and correct object ID, otherwise during playback, the material may be desynchronization due to object ID mismatch. Accordingly, the method may include steps of assigning unique object IDs to identified material or object instances. The unique object IDs are maintained across recording and playback. For example, if object ID 4 is a material, it must be the same material on both recording and playback clients, otherwise the playback will not replicate the original session.

Engine specific differences can also be handled with redirectors. For example, calling get_material in Unity creates a new material while calling a similar function in Unreal 4 does not create a new material. Accordingly, the data get_material data extracted and stored as part of the session recording and later played back by a playback client, is agnostic with respect to how a material is instantiated or not, simply that it does or does not occur. Accordingly, a redirector for get_material, may have additional logic for handling an Unreal 4 material function as compared to a Unity material function. The Unity redirector including a unique object ID for the material instance while the Unreal 4 redirector, not having unique materials, does not use unique object IDs.

Referring back to FIG. 15A, at block 2130, the redirect functions are inserted into the appropriate DLLs. This may include modification of existing DLLs used or provided by the operating system or the program or newly generated DLLs. This modifies existing DLLs as well as creates additional DLLs if extended functions are generated. These extended functions are defined by configuration data for each program. Using this configuration data, the existing DLLs are analyzed and new functions are written based on the extended functions. Adding extended functions to new DLLs rather than modifying exiting DLLs aids in maintaining and organizing the functions.

The DLLs are then compiled with references to the specific game-engine employed by the program. Once compiled, only the compiled DLL and the communication assembly modules which handle the native communication between the backend and the program for recording and playback are stored. None of the original core-engine technology references are used.

The DLLs are then placed into the target product directory. At block 2131 a set of functions representing each function within the target program's files is generated. The set of functions may be determined by scanning the target program files, including the DLLs, such as the managed DLL assemblies and any modified or newly generated DLLs, for each function located within the files. This generates a set of every function used by the target product that may be intercepted and redirected.

After determining the set of functions, at block 2132 each assembly file is parsed for the redirector attribute. The redirector being as discussed above with respect to step 2142 and FIG. 15B.

At block 2133, for each redirector attribute parsed in block 2132, a target function is located within the product DLL assemblies. The target function may be located in the product DLL assemblies based on the results of block 2131, or through a function locator, that locates the function within the product DLL assemblies. The function locator may analyze all included assemblies by searching for one or more of function name, signature, return types, namespace and included parameters.

After locating a function, if a redirector is determined to be associated with the function, then the associated redirector is added to a set of redirectors at block 2134. The set of redirectors allows the redirection of the original function to the communication assemblies module without disrupting the operation of the target program. By maintaining the existing original functionality in the redirector, the CIL Assembly instruction to call can be changed to the redirector instead of the original function. Where the original CIL was IL_0005: call void Assembly.OriginalFunction(FunctionParam1), it may be replaced with IL 0005: call void Assembly.NewFunction(FunctionParam1). The execution for the source project is identical, but necessary data may be stripped from the data recorded for replay.

After generating a set of functions associated with redirectors at block 2134, the target program DLL assemblies are then parsed again. At block 2135, the product DLL assemblies are parsed for IL opcodes for each redirected function in the target program. A redirected function associated with a parsed IL opcode may be matched to a redirected function of the set of redirected functions by matching one or more of the function signature or name, as well as the parameters or arguments that are passed to the function.

After a parsed IL opcode is matched with a redirected function, the IL opcode is modified through a process called reweaving at block 2136. When reweaving the IL opcode, the original product function call IL opcode is redirected from the source engine to the recording assembly. Then, the original product function call IL opcode is weaved into the recording assembly such that it is sent by the recording assembly to the target source engine assembly during operation.

In this way, the recording assembly is passed the appropriate IL opcodes and associated passed parameters for recording, and then able to pass those opcodes to the source engine for execution, without impacting gameplay.

Figure 16:
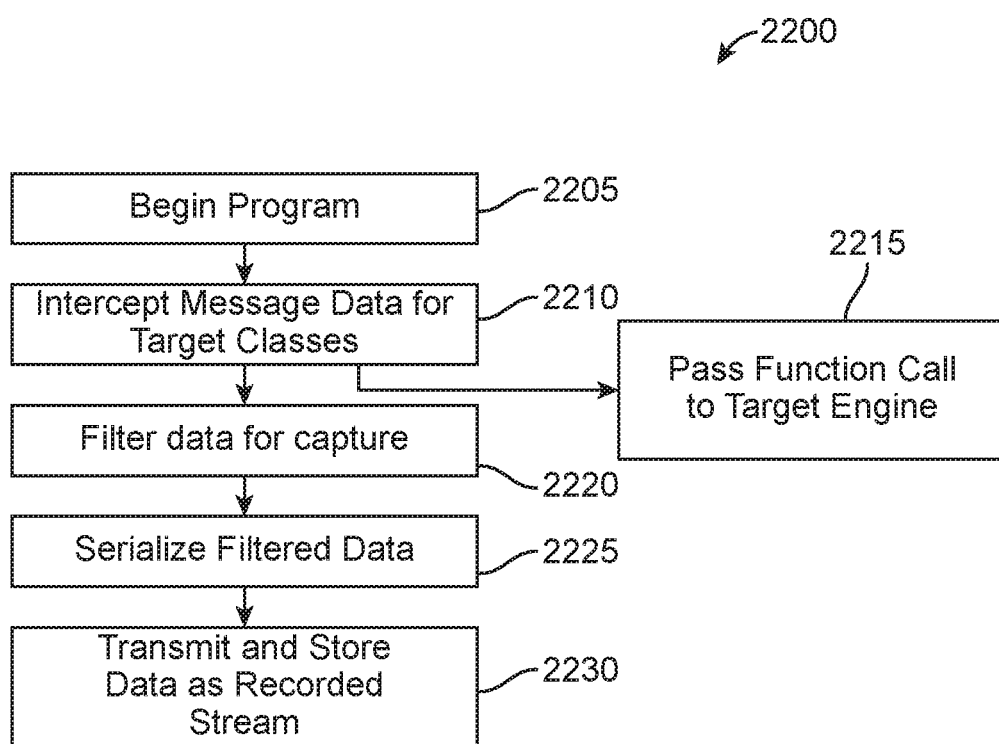
FIG. 16 illustrates a method of recording sessions according to one or more embodiments disclosed herein.

FIG. 16 illustrates a method 2200 of recording sessions according to one or more embodiments disclosed herein. For example, method 200 may be executed as part of method 500, for example at blocks 502 or 504. At block 2205 the target program is stared. This may be a command from a user to begin the program. When the program begins, a session, such as a game session, is started and the program begins sending messages, including function calls to carry out the various tasks associated with the session. The messages and function calls may be associated with the generation of anything that is visual, auditory, haptic, or otherwise associated with the game environment that is used to create the environment for the spectator. These function calls and messages may be graphics engine function calls for mesh renderers, shaders, and object materials, which draw the visual appearances of the game objects and control how textures or visual effects should render. The function calls and messages may also be audio system calls to play a particular sound file or musical notes.

At block 2210 the messages and function calls for target classes, discussed above, are intercepted based on the redirector located in the DLL assemblies and the rewoven IL opcodes, both also discussed above. The intercepted function calls may be passed to a communication assembly At block 2215 the intercepted messages and function calls are passed to the appropriate engine targeted by the function call or message.

At block 2220 the intercepted messages and function calls are filtered as part of the redirector code discussed above with respect to FIG. 15B. The message and function calls may filtered such that unnecessary or duplicate data is not passed on for storage and later replay. For example, some game-code sets the position of objects to 0, 0, 0 every frame, either because it is a desired behavior, or by mistake, however, such game-code does not alter the performance of the game itself, but recording these calls generates an excess of network data. Accordingly, before the serialization step, deduplication or no-effect filter detects and removes such data. The data associated with function calls and messages that are not filtered out at block 2220 are passed to the serialization module.

At block 2225 the data associated with function calls and messages for session recording and replay are received by the serialization module and serialized. The serialization module converts the function data from a collection of primitive(s) and function calls format into a serialized format for storage or to send over the network. The serialized form is an offset into an array of delegates to point at the correct function on the playback side for processing, and a flatbuffer encoded byte array for the rest of the primitive data. This allows us the use of existing serializer (flatbuffers), as well as being an efficient way to find the destination function for processing (delegates).

At block 2230 the serialized data is transmitted for storage or stored locally as a recorded session stream.

Figure 17:
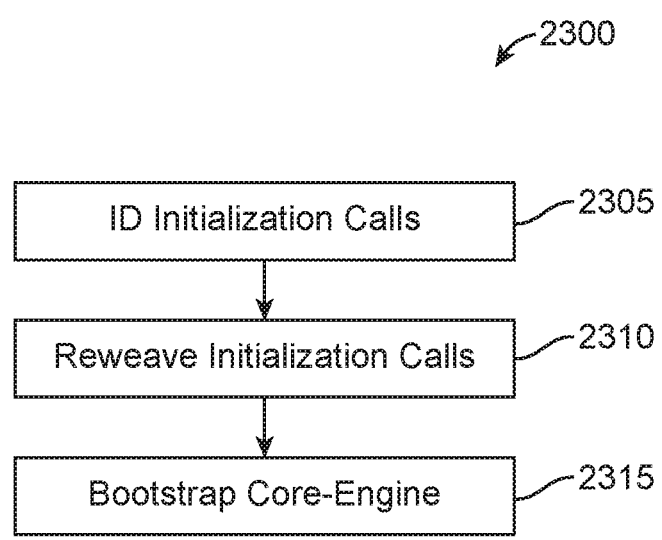
FIG. 17 illustrates a method of modifying program operation for playback according to one or more embodiments disclosed herein.

FIG. 17 illustrates a method 2300 of modifying a target program for session playback according to one or more embodiments disclosed herein. For example method 300 may be used to modify program 234 of virtual reality application 220. In this way, a gameplay client may be modified into a replay client. Programs, such as video game programs, are not designed for pure session replay functionality. Instead, their goal is gameplay and generating sessions for gameplay. When modifying an existing program for replay, as described herein, the operation of the program itself is not initialized. Instead, the program is just a placeholder that initializes the assemblies, such as the DLL assemblies associated with the audio, visual, and haptic functions associated with generating the environment of a session. This means that all initialization calls for every element that exists or can exist in the target program are intercepted. If a program object activates and attempts to do something program specific, for example execute gameplay functions, playback of a recorded session may be disrupted.

Accordingly, at block 2305 the initialization calls are identified. The initialization function calls may be identified by parsing each assembly associated with the target program for initializations function calls. Initialization calls can also include instantiation, cloning and constructors. These calls may be treated discretely because of how they could be executed per-engine. There may be many code entry points in each program and these entry points may vary with each program and with each game engine. In order to aid in capturing each initialization call, a wide range function calls, such as events, callbacks, initialization, constructors, loading and deserialize calls are identified.

At block 2310, each identified initialization call is reweaved. Much like the reweaving discussed above to intercept the function calls for recording and passing them on to the appropriate assembly, the reweaving here intercepts the initialization calls. However, gameplay initialization calls are disabled and not forwarded to the appropriate assemblies. Instead, only core engine initialization calls and are passed to the appropriate assemblies. This allows for initialization of the core engine which enables the replay stream to then use the assemblies to replay the session based on the record session steam. At the base level, every single piece of game functionality may be removed. For example, before redaction, a function might be Void ShootGun(TheGun gunToShoot) {gunToShoot.Shoot( ) makeSound(shootSound);}. The redacted DLL may be Void shootgin(thegun guntoshoot){ }. The function is left in the core engine, but the functionality is removed, sometimes completely. Data may be similarly modified, but because the game engine still loads the game-content (art, hierarchies, sounds, textures and materials), serialization compatibility is maintained. This means identifying all variables and properties that the game engine requires to load an object from disk. These properties are maintained accordingly. Lastly, any client-side effects that have been determined to be visually significant but gameplay irrelevant may be maintained. For example, a fixed camera blur to add some bloom to the game world, or a sound effect that simply loops in the background may be maintained in the replay client, rather than recording and replicating this data over the network continually, this functionally may instead be maintained in the client for use during replay.

In some embodiments, the reweaving includes adding object control functionality that allows for object control at a more granular level without triggering game-level code. This allows for use of game content without the gameplay functionality.

At block 2315, the core-engine is bootstrapped. Here, initialization functions for the assemblies used to generate audio, visual, and haptic elements of the session environment are added to the code in order to boot them and prepare them for session replay, without initialization of the gameplay functions.

Figure 18:
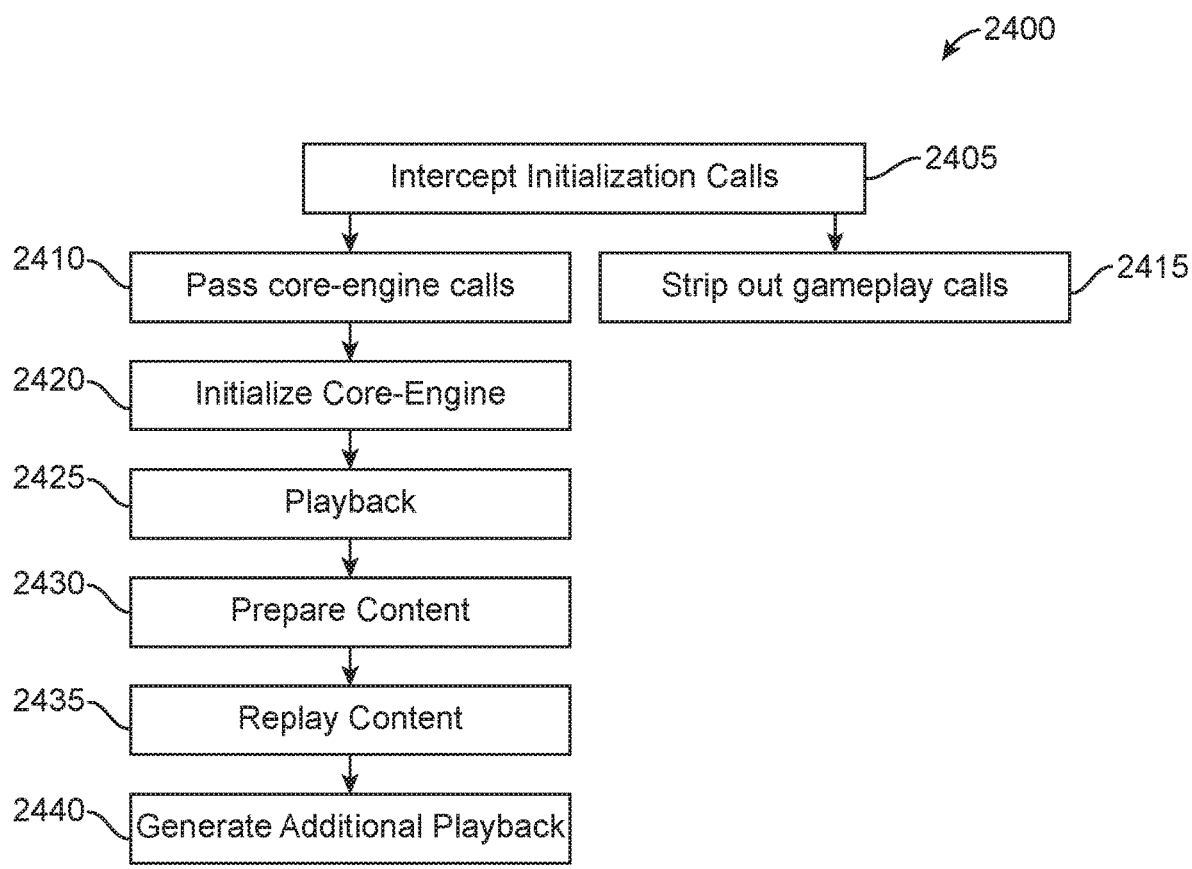
FIG. 18 illustrates a method of session replay without gameplay execution according to one or more embodiments disclosed herein.

Once the playback client is completed, the client may be used for session replay, as discussed, for example, with reference to FIG. 18.

FIG. 18 illustrates a method 2400 of session replay without gameplay execution according to one or more embodiments disclosed herein.

At block 2405 each initialization call from the playback client is intercepted. At block 2415, the gameplay initialization calls are stripped out or otherwise disabled and not passed on to their target while at block 2410 core engine calls are passed on to their target assemblies. At block 2415, the initialization calls are executed and the core-engine is initialized.

At block 2420, the passed initialization calls are executed and the core engine is initialized.

Once the core engine is initialized, at block 2425 playback begins. During playback, the replay data from the recorded replay stream, such as the function calls and passed parameters, are executed by the client while any gameplay content is disabled.

Also during playback, at block 2430 the playback content, such as objects, materials, etc., are prepared. In some embodiments, each piece of content from the recorded session, such as the objects, materials, etc., are assigned a unique identifier so that it can be called, rendered, and modified as appropriate for the replay. In some embodiments, preparing the content also includes modification to the content. For example, because the playback content is controlled by the bootstrapped replay client and the replay stream, modified content may be played in place of the recorded content. For example, a recorded object may be replaced by a different object, for example, an object retrieved from a content delivery network that is instantiated at runtime during playback. For example, in some embodiments, the recorded stream may include an object, such as a player avatar for a human head, while during playback, a humorous full-body panda avatar is substituted in place of the human head. The panda avatar may then move about the replay in the same way as the original human avatar according to the rest of the replay functions within the recorded replay session stream. As another example, a generic soda may have been used in the recorded session, however, during replay, the object may be instantiated with a branded soda can.

In some embodiments, other visual aspects of the replay may be modified. For example, new collision volumes for a game-scene may be loaded for easier teleporting, different camera effects may be loaded, and visual effects may be replaced, for example, with a lower fidelity version of the visual effect. These modifications include changes to the replay client assemblies, without modification of the source stream.

At block 2435 the content prepared at block 2430 is replayed. Replaying the content may include generating the visual, audio, and haptic content of the replay stream, as modified by at block 2430. For example, graphics engine function calls may be executed by the graphics engine and the resulting graphics are displayed on a screen.

In some embodiments when the content is replayed at block 2435, a newly generated replay stream is generated. At block 2440 the data for replay is recorded in addition to being replayed on a screen or in place of replaying on a screen. For example, when replaying the replay based on the recorded session stream, for example, on a main camera's point of view, additional camera locations may be placed at additional, different locations in the data for spectators and collision channels on collision volumes on game objects may be updated to instead hook into a spectator viewing system to let the spectators move change their point of view to locations not originally intended or used in the recorded session.

While preferred embodiments of the present invention have been shown and described herein, it will be apparent to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of replaying a replay stream of a game session on a target program, comprising:
    instantiating a target program for replay of the replay stream;
    intercepting a plurality of initialization calls made by the target program;
    passing a first subset of the plurality of initialization calls comprising core engine function calls to a core engine and not passing a second subset of the plurality of initialization calls to the core engine, wherein the second subset of the plurality of initialization calls are gameplay calls;
    initializing the core engine;
    receiving a first replay stream;
    preparing content used in the first replay stream; and
    executing the first replay stream using the core engine.

2. The method of claim 1, wherein executing the first replay stream includes generating function calls based on function call data within the first replay stream to the target program graphics engine and further comprising:
    generating a graphical representation of the session from a first point of view.

3. The method of claim 1, further comprising:
    generating a second replay stream based on the replay of the first replay stream, the second replay stream being based on second point of view within the generated graphical representation.

* * * * *